(12) United States Patent
Connaughton et al.

(10) Patent No.: US 9,463,348 B2
(45) Date of Patent: *Oct. 11, 2016

(54) YOGA MAT WITH SUPPORT AND TRACTION

(71) Applicant: Sequence LLC, Chestnut Hill, MA (US)

(72) Inventors: Stephanie F. Connaughton, Chestnut Hill, MA (US); Daniel B. Lazarchik, South Boston, MA (US)

(73) Assignee: SEQUENCE LLC, Chestnut Hill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,975

(22) Filed: Jul. 30, 2014

(65) Prior Publication Data

US 2014/0342118 A1    Nov. 20, 2014

Related U.S. Application Data

(63) Continuation-in-part of application No. 13/193,789, filed on Jul. 29, 2011, now Pat. No. 8,822,012.

(60) Provisional application No. 61/369,656, filed on Jul. 30, 2010, provisional application No. 61/410,422, filed on Nov. 5, 2010.

(51) Int. Cl.
*B32B 3/24* (2006.01)
*A63B 21/00* (2006.01)
(Continued)

(52) U.S. Cl.
CPC ............ *A63B 21/1473* (2013.01); *A63B 6/00* (2013.01); *A63B 21/4037* (2015.10); *B32B 3/266* (2013.01); *B32B 3/30* (2013.01);
(Continued)

(58) Field of Classification Search
CPC .......... B32B 3/266; Y10T 428/24331; Y10T 428/24339
See application file for complete search history.

(56) References Cited

U.S. PATENT DOCUMENTS 5,171,619 A * 12/1992 Reuben .................. B29C 43/28
                                                        156/60
5,820,573 A    10/1998 Ramos
(Continued)

FOREIGN PATENT DOCUMENTS

KR         200319548 Y1    7/2003
KR         101380100 B1    4/2014
(Continued)

OTHER PUBLICATIONS 11813231.5, "European Application Serial No. 11813231.5, European Extended Search Report mailed Oct. 28, 2014", Sequence LLP, 7 Pages.
(Continued)

*Primary Examiner* — William P Watkins, III
(74) *Attorney, Agent, or Firm* — GTC Law Group PC & Affiliates

(57) ABSTRACT

The present disclosure provides a layered structure including a top layer, a bottom layer, and a grip component disposed between the two layers such that columns from the grip component extend at least partially through openings in the top layer and/or bottom layer. Also provided are mats including the layered structure such that different grip characteristics are provided on the ends of the mat and/or the two sides of the mat by varying one or more characteristics or components of the layered structure.

26 Claims, 25 Drawing Sheets

(51) Int. Cl.
   *A63B 6/00* (2006.01)
   *B32B 3/26* (2006.01)
   *B32B 3/30* (2006.01)
   *B32B 7/08* (2006.01)

(52) U.S. Cl.
   CPC .......... *B32B 7/08* (2013.01); *A63B 2209/026* (2013.01); *B32B 2307/744* (2013.01); *B32B 2437/02* (2013.01); *B32B 2471/04* (2013.01); *Y10T 428/24331* (2015.01); *Y10T 428/24339* (2015.01); *Y10T 428/24992* (2015.01)

(56) References Cited

U.S. PATENT DOCUMENTS

| | | |
|---|---|---|
| 6,564,397 B1 | 5/2003 | Hawley et al. |
| 6,743,325 B1 | 6/2004 | Taylor |
| 6,935,382 B2 * | 8/2005 | Buckley .................. D03D 1/00 139/391 |
| 8,298,648 B2 | 10/2012 | Turner et al. |
| 8,822,012 B2 | 9/2014 | Franks et al. |
| 2004/0148725 A1 * | 8/2004 | Blum et al. ............. A47L 23/22 15/215 |
| 2004/0250346 A1 | 12/2004 | Vasishth |
| 2005/0003173 A1 | 1/2005 | Nichols |
| 2005/0129910 A1 | 6/2005 | Chang |
| 2007/0207286 A1 * | 9/2007 | Craig et al. ........... A47L 23/266 428/89 |
| 2007/0277401 A1 | 12/2007 | Young-Chul |
| 2008/0081153 A1 | 4/2008 | Yeh |
| 2008/0305304 A1 | 12/2008 | Yeh |
| 2010/0129573 A1 | 5/2010 | Kim |
| 2010/0299833 A1 | 12/2010 | Kessler |
| 2011/0004998 A1 | 1/2011 | Losio |
| 2012/0076981 A1 | 3/2012 | Franks et al. |
| 2015/0165261 A1 | 6/2015 | Lazarchik et al. |
| 2015/0165262 A1 | 6/2015 | Lazarchik et al. |
| 2016/0066648 A1 | 3/2016 | Lazarchik et al. |

FOREIGN PATENT DOCUMENTS

| | | |
|---|---|---|
| KR | 1020140104210 A | 8/2014 |
| WO | 9804170 A1 | 2/1998 |
| WO | 2012016116 A2 | 2/2012 |
| WO | 2012016116 A3 | 5/2012 |
| WO | 2016/040129 A1 | 3/2016 |

OTHER PUBLICATIONS

PCT/US2011/045846, "International Application U.S. Appl. No. PCT/US2011/045846, International Preliminary Report on Patentability mailed Feb. 14, 2013", Bendigear LLC et al., 6 pages.

PCT/US2011/045846, "International Application U.S. Appl. No. PCT/US2011/045846, International Search Report mailed Mar. 28, 2012", Bendigear LLC et al, 12 pages.

PCTUS2015048390, "International Application Serial No. PCT/US2015/048390, International Search Report and Written Opinion mailed Dec. 10, 2015", Sequence LLC, 12 Pages.

* cited by examiner

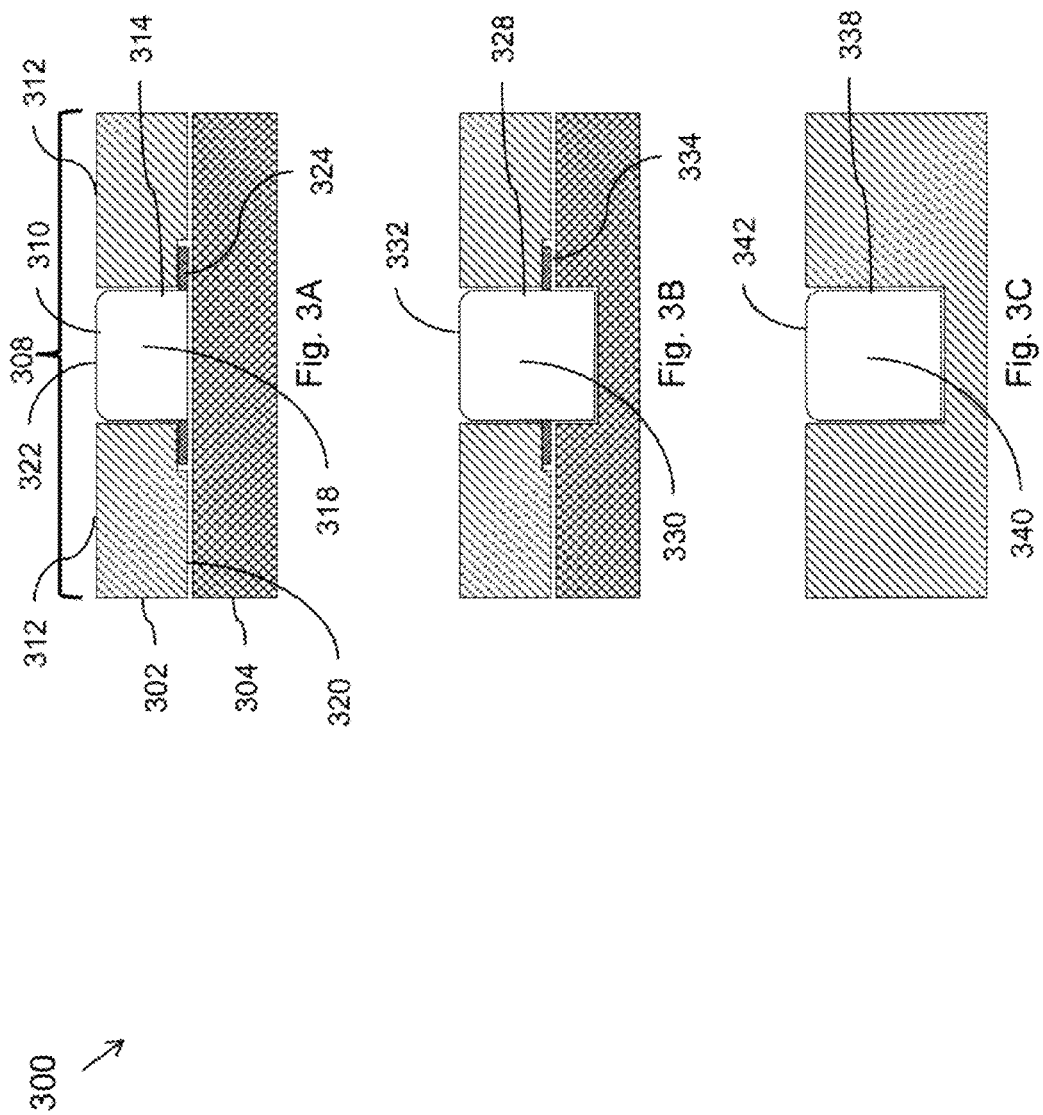

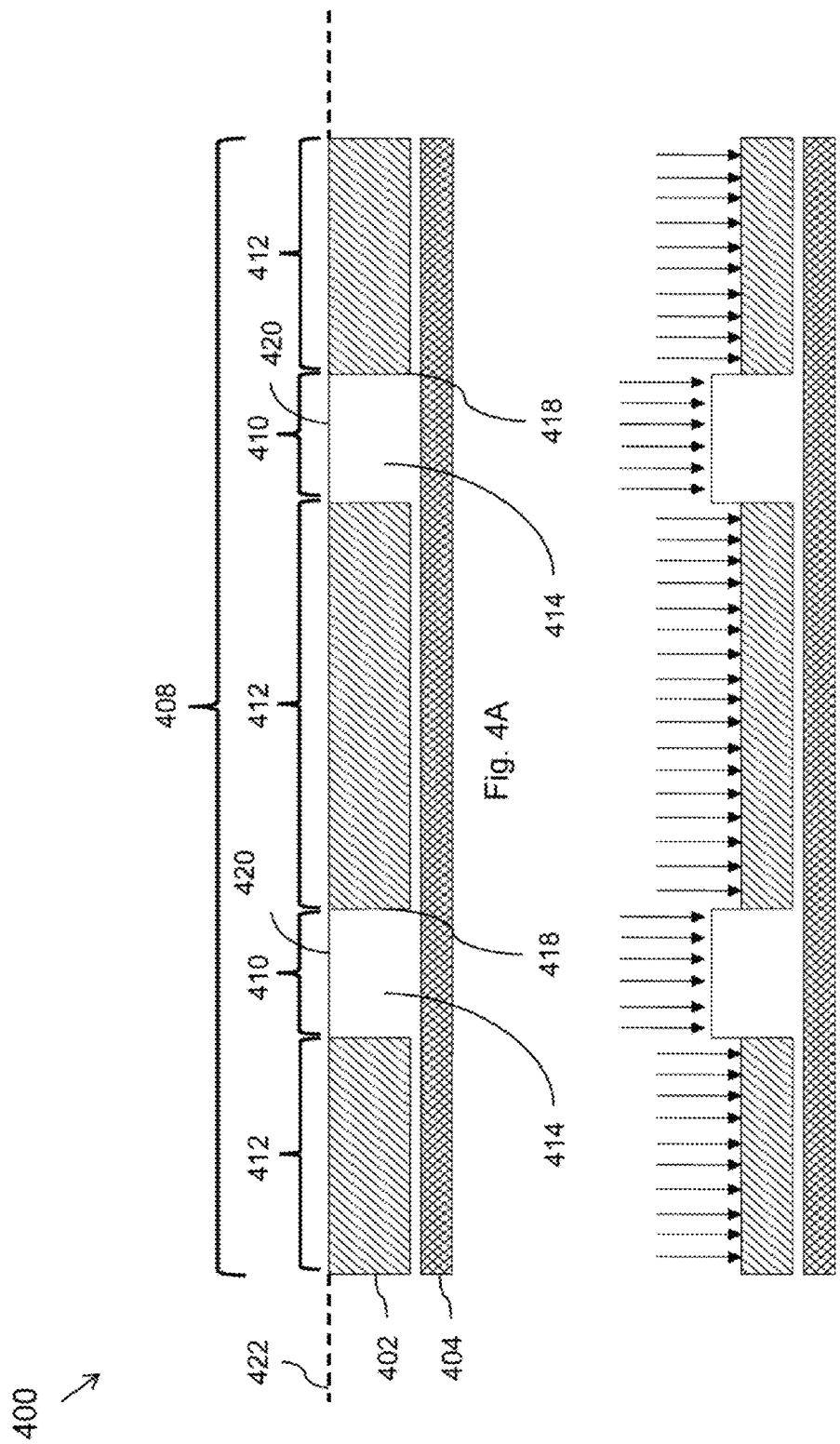

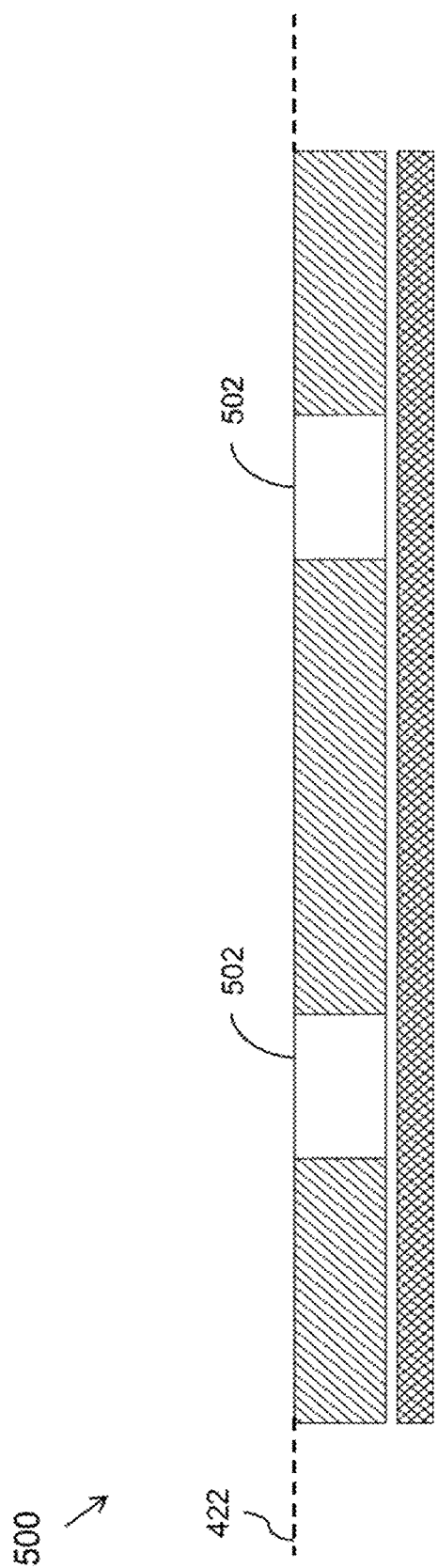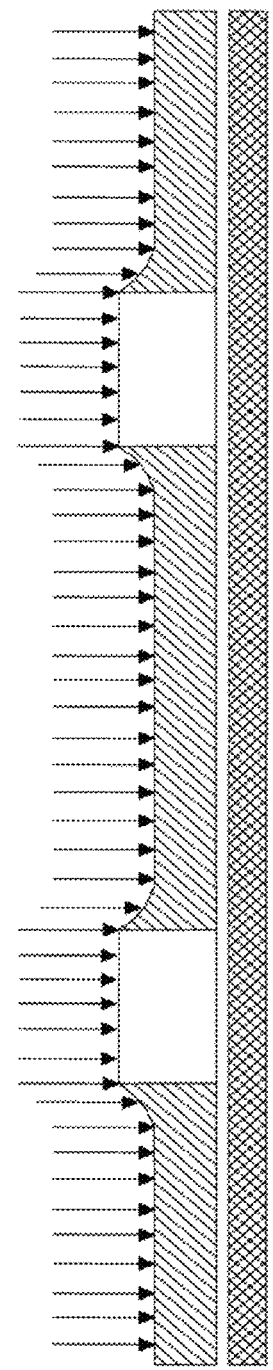

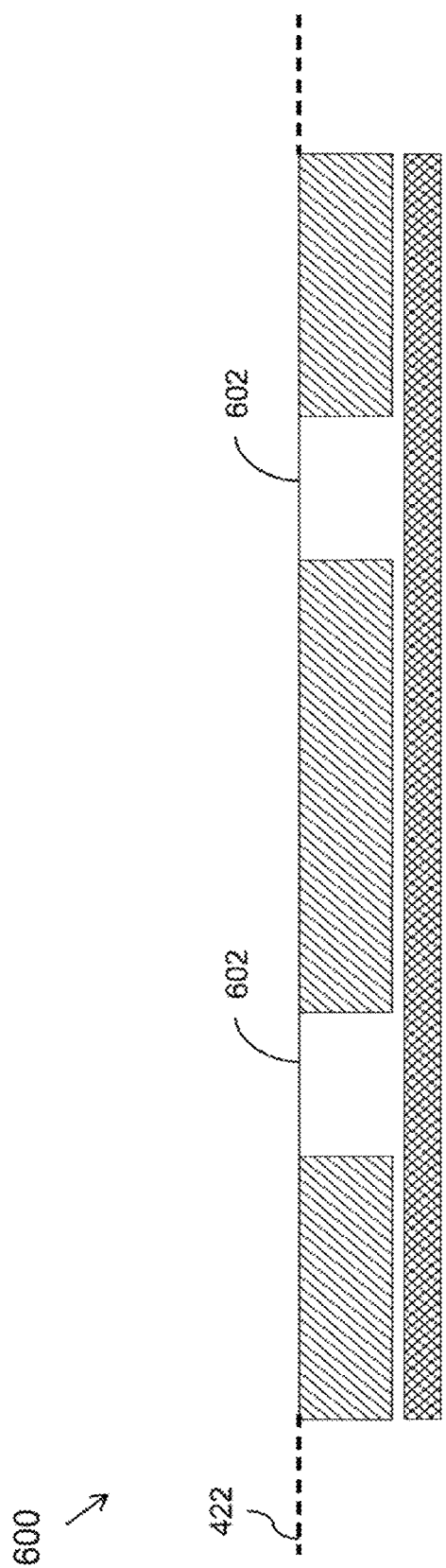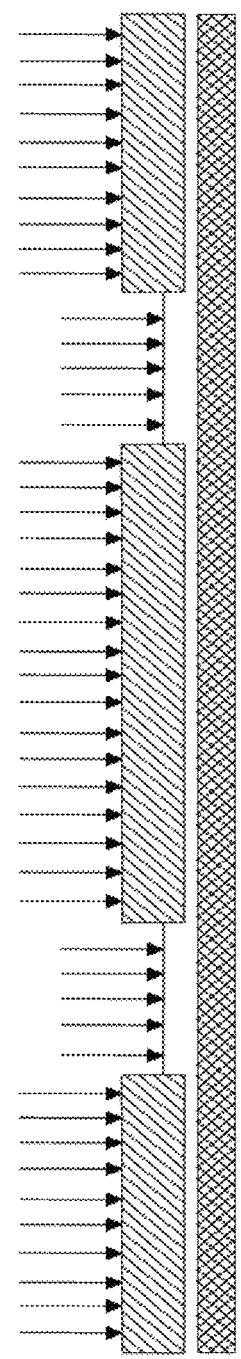
Fig. 6A
Fig. 6B

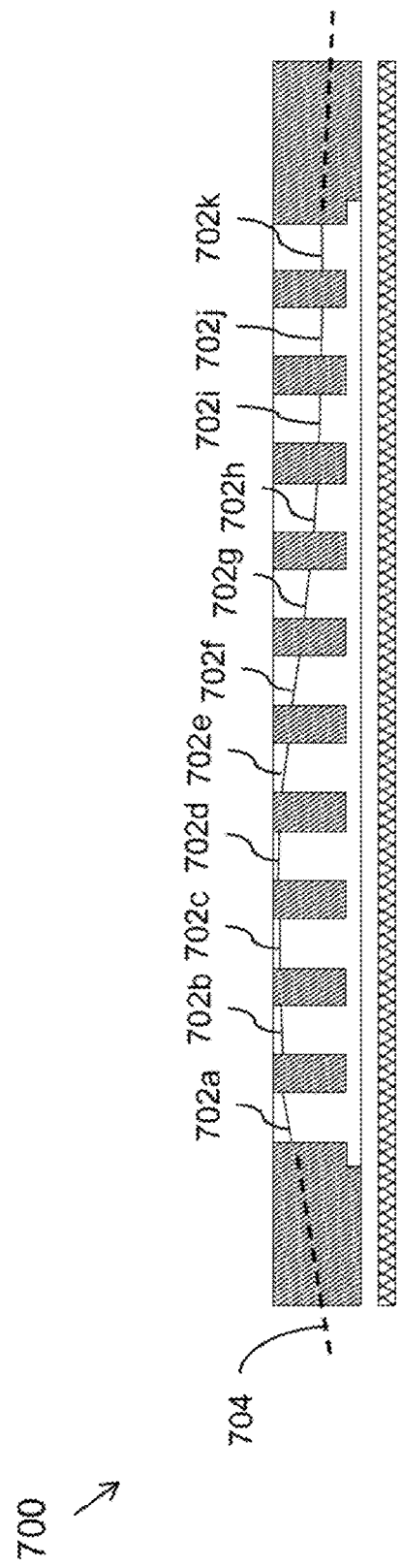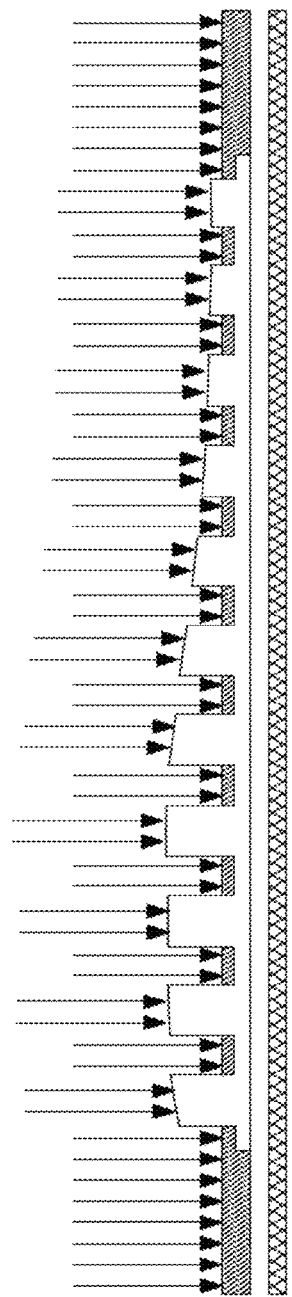
Fig. 7A
Fig. 7B

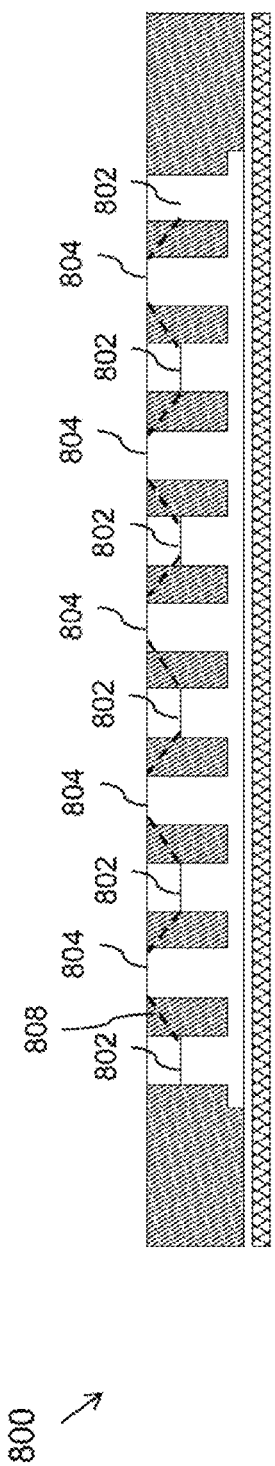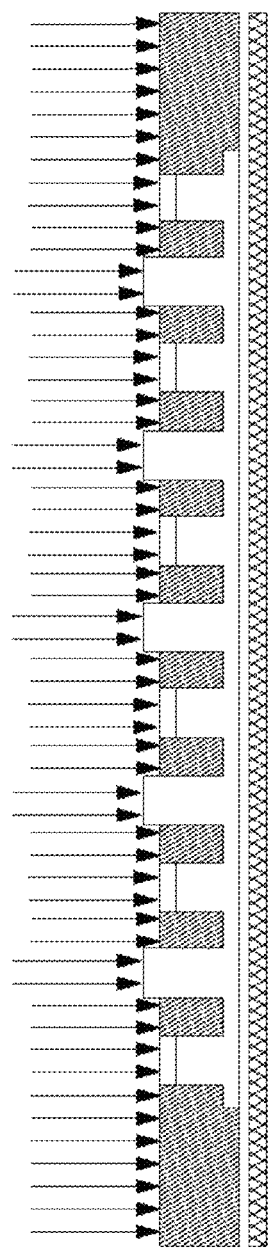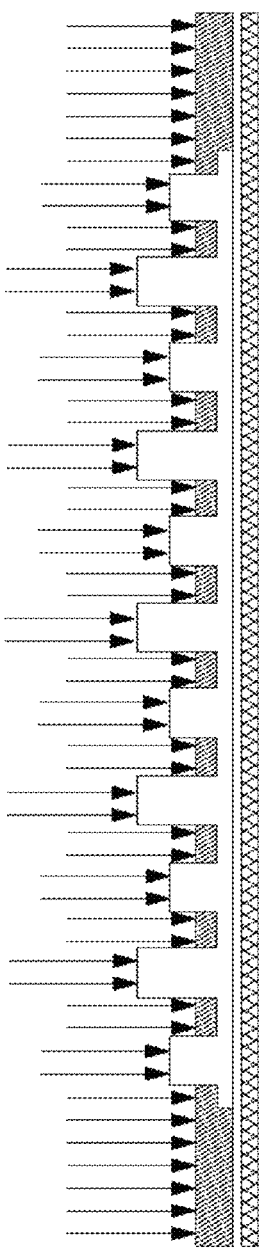

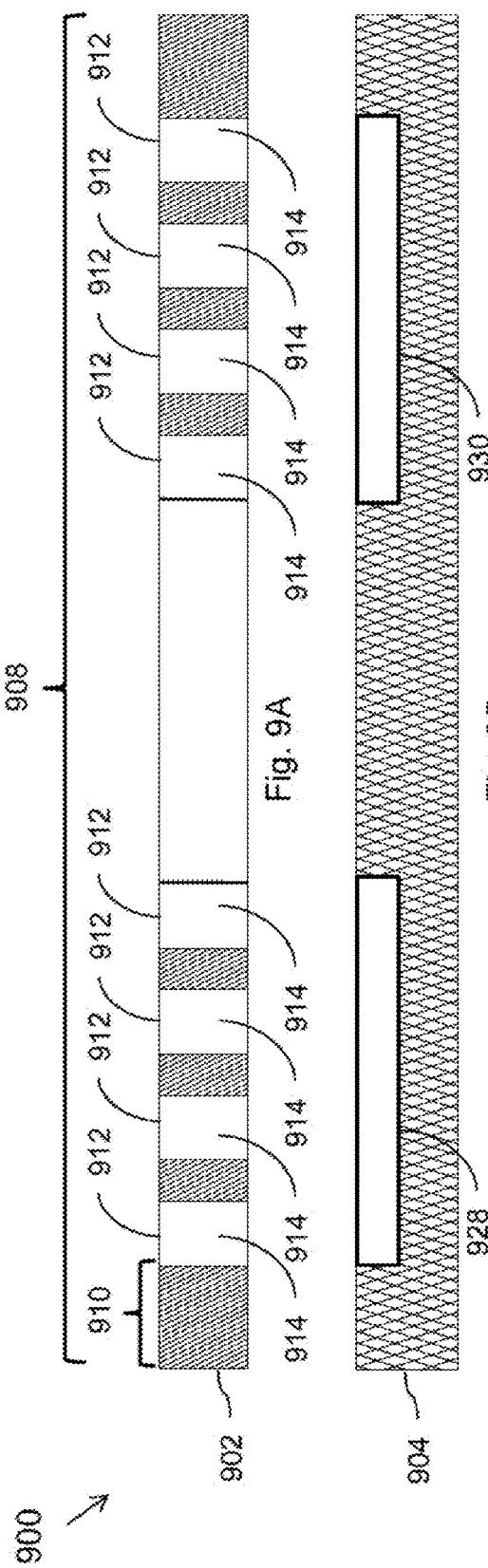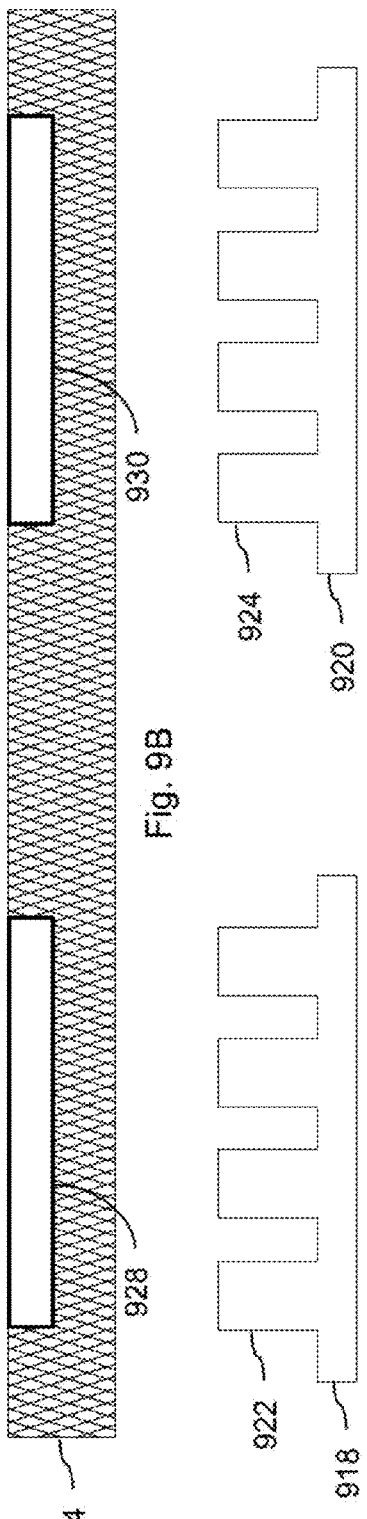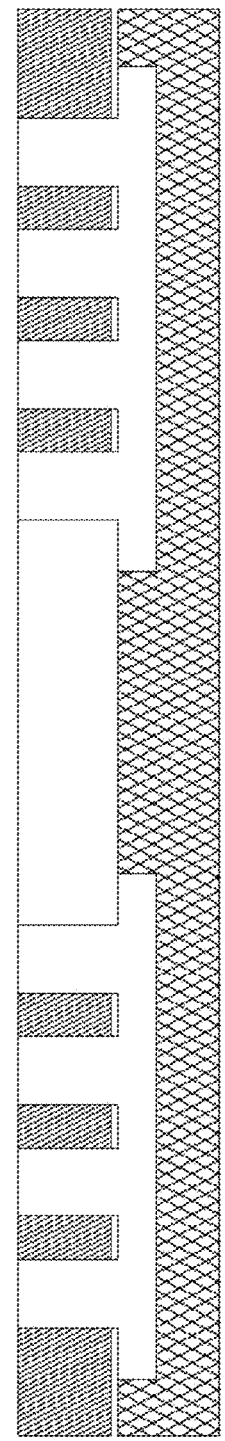

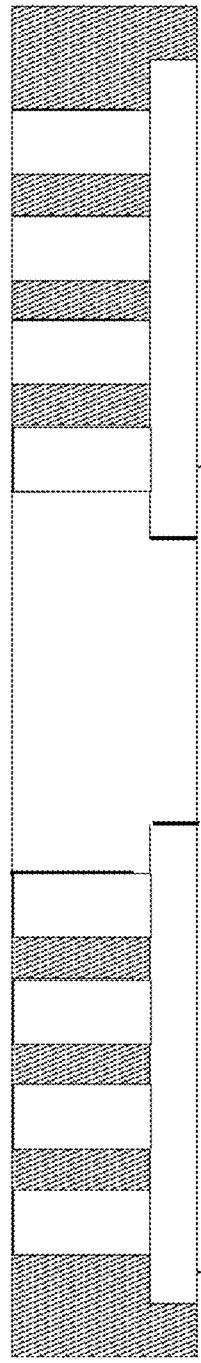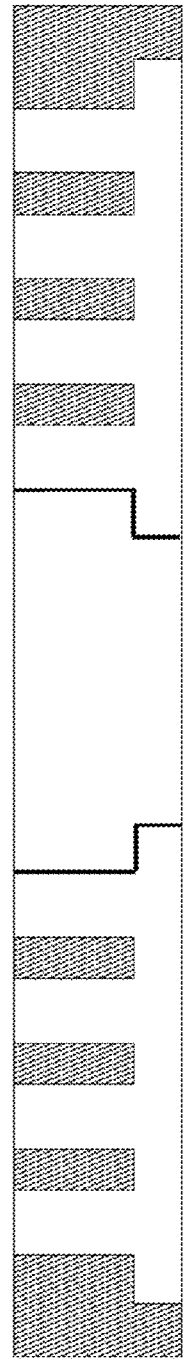

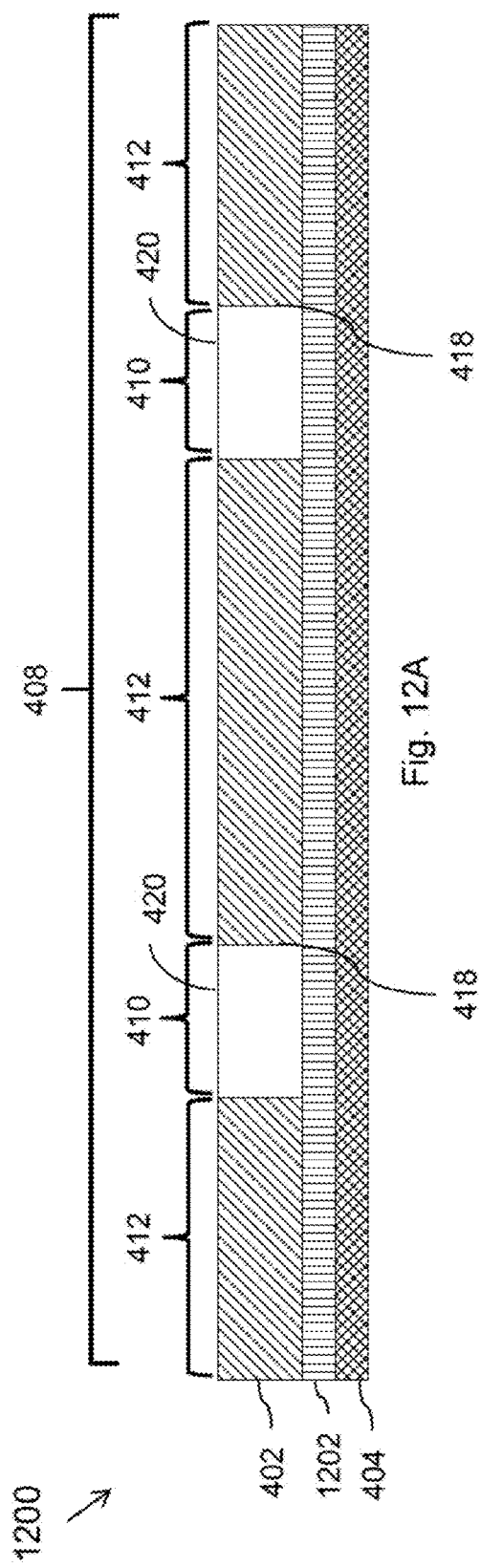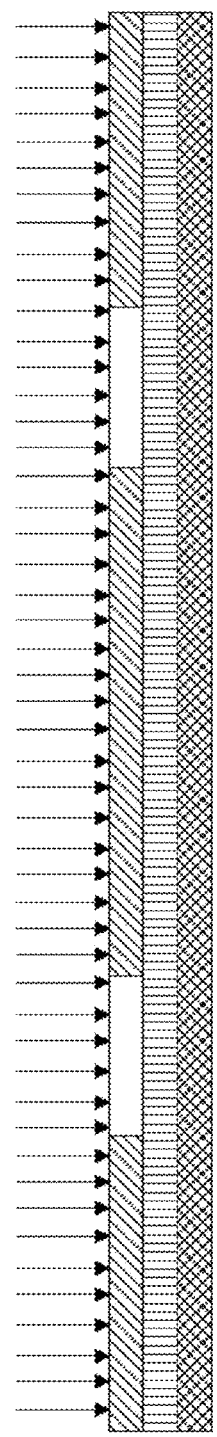

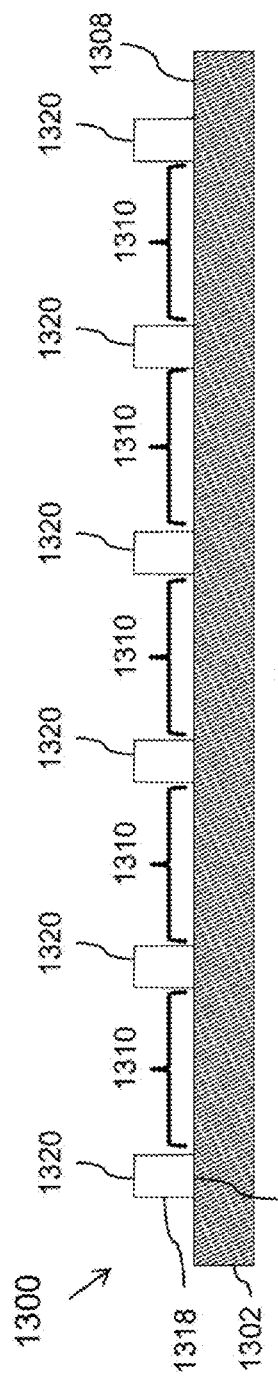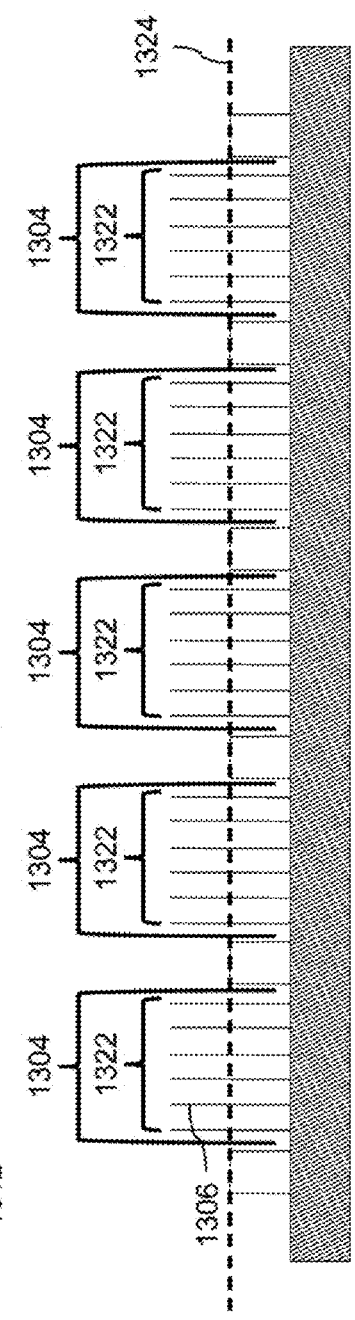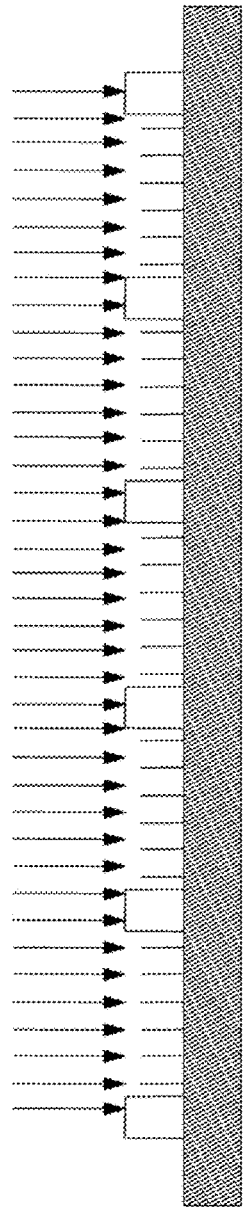

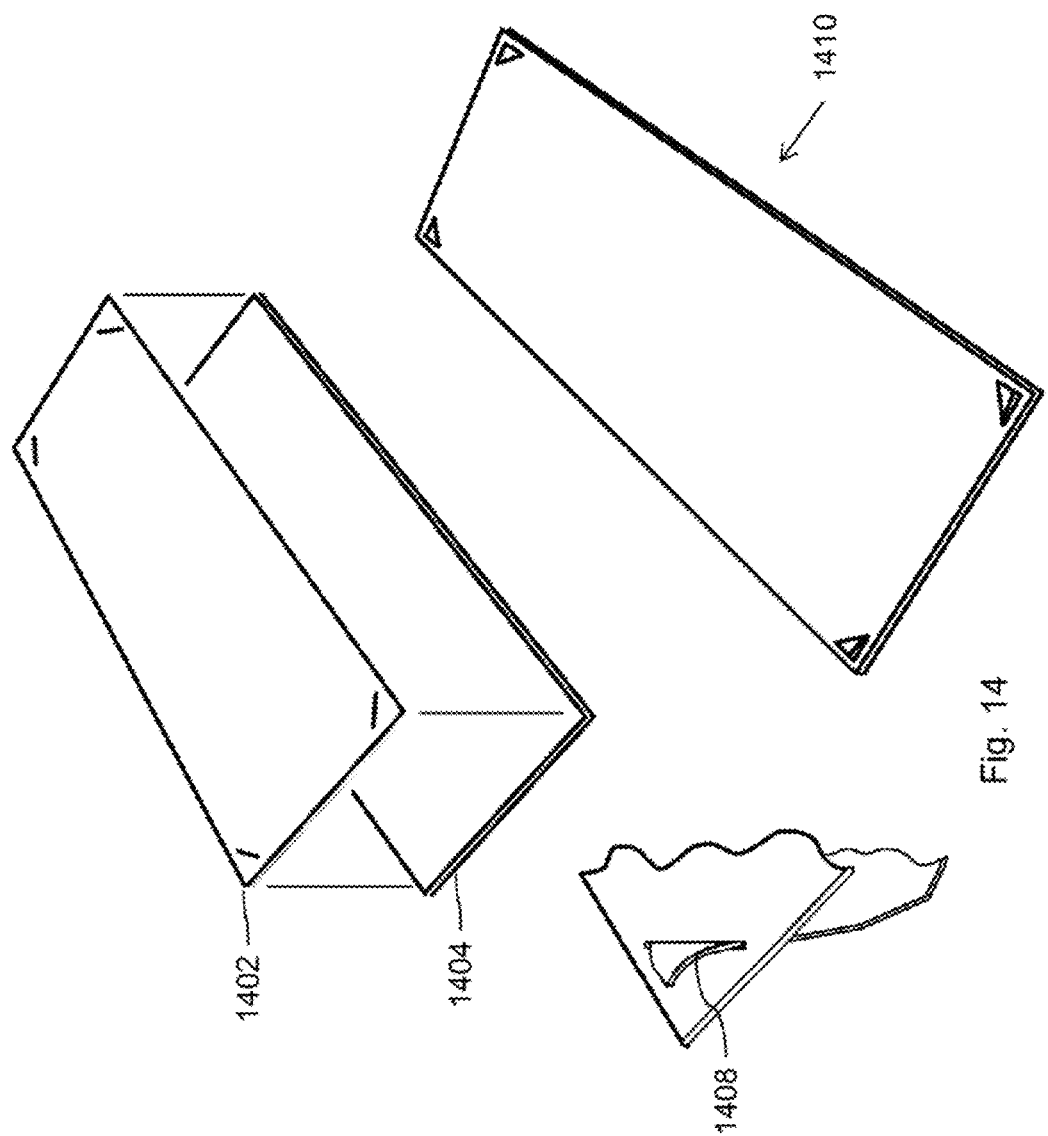

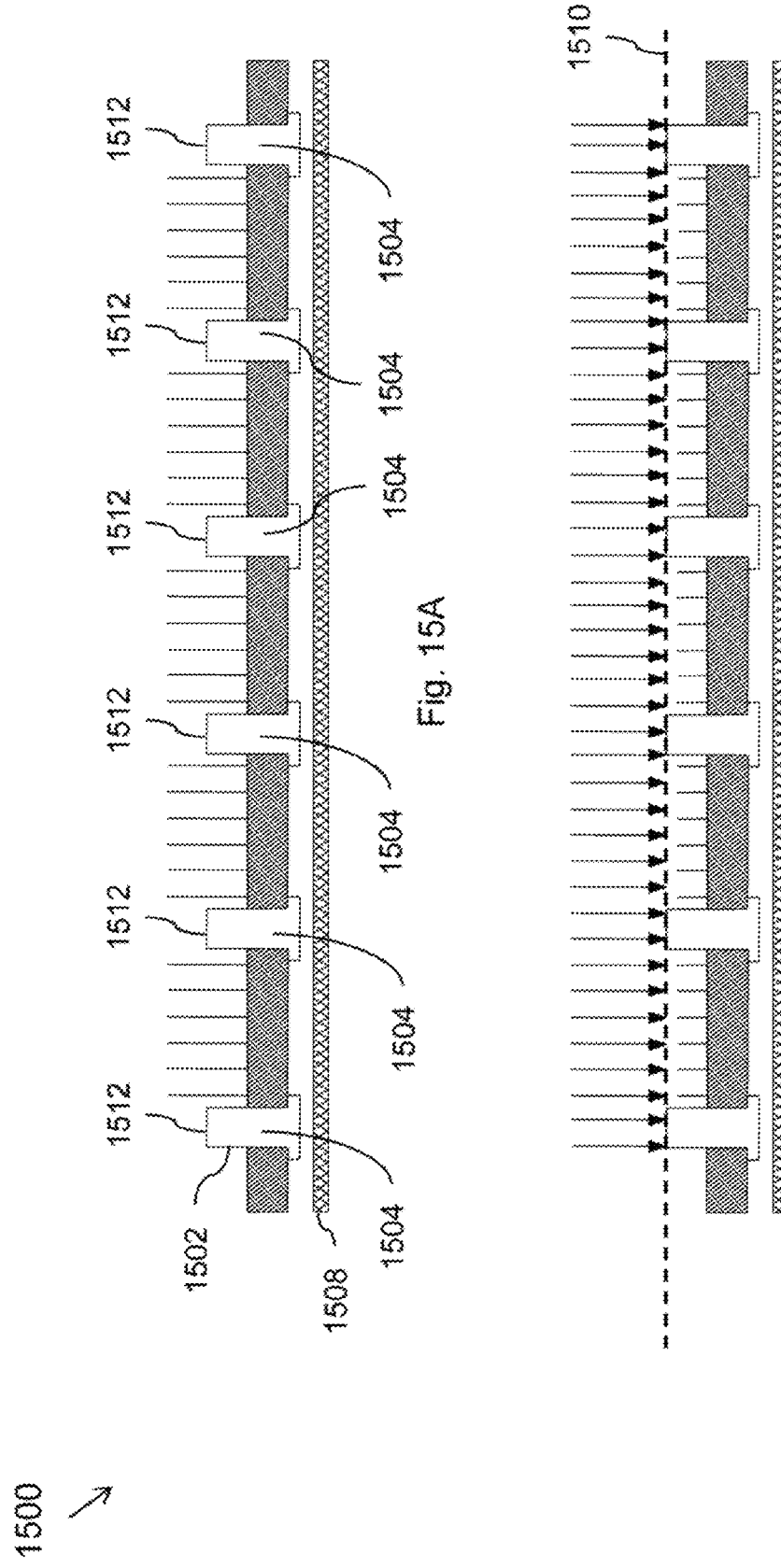

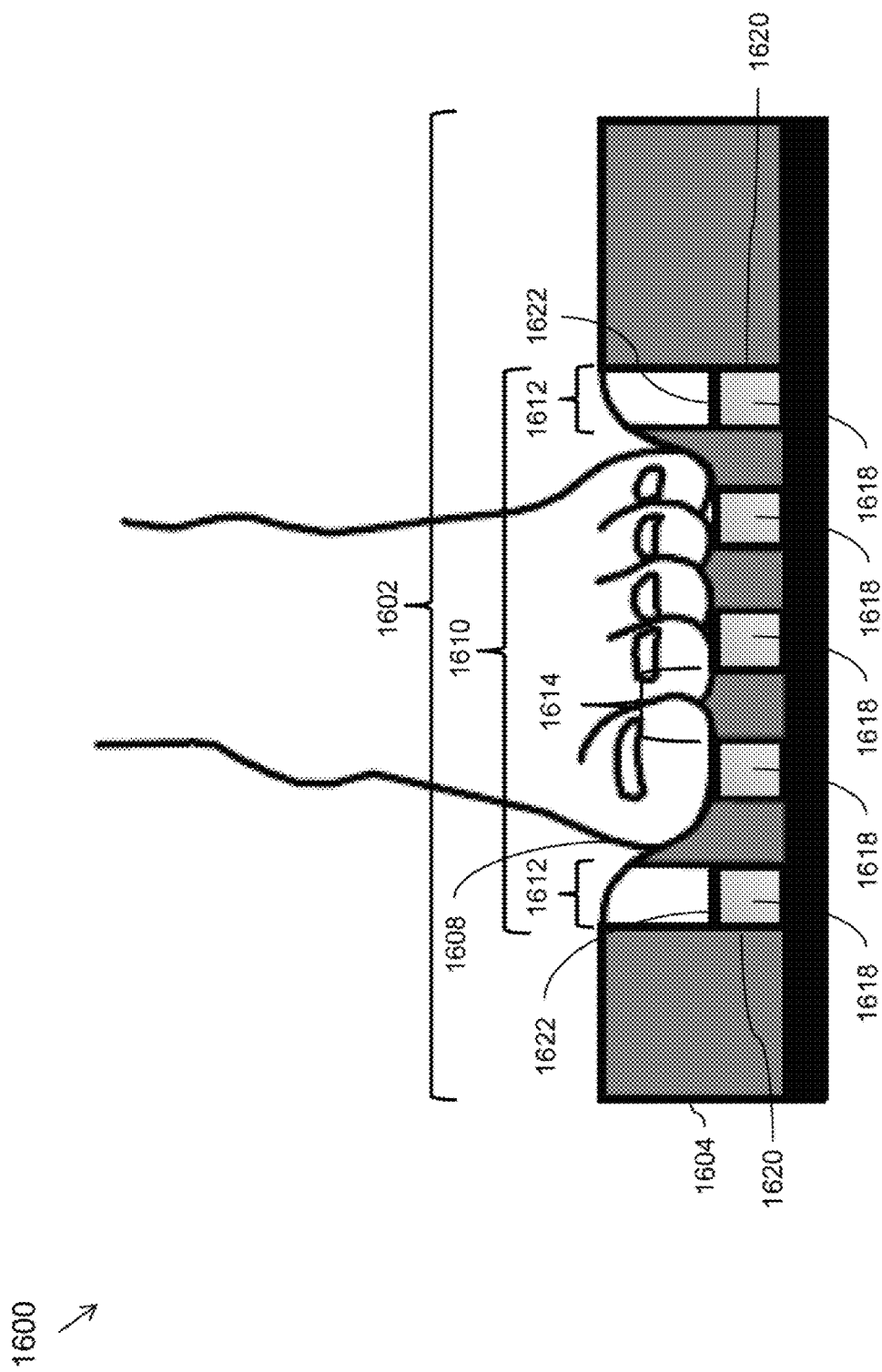

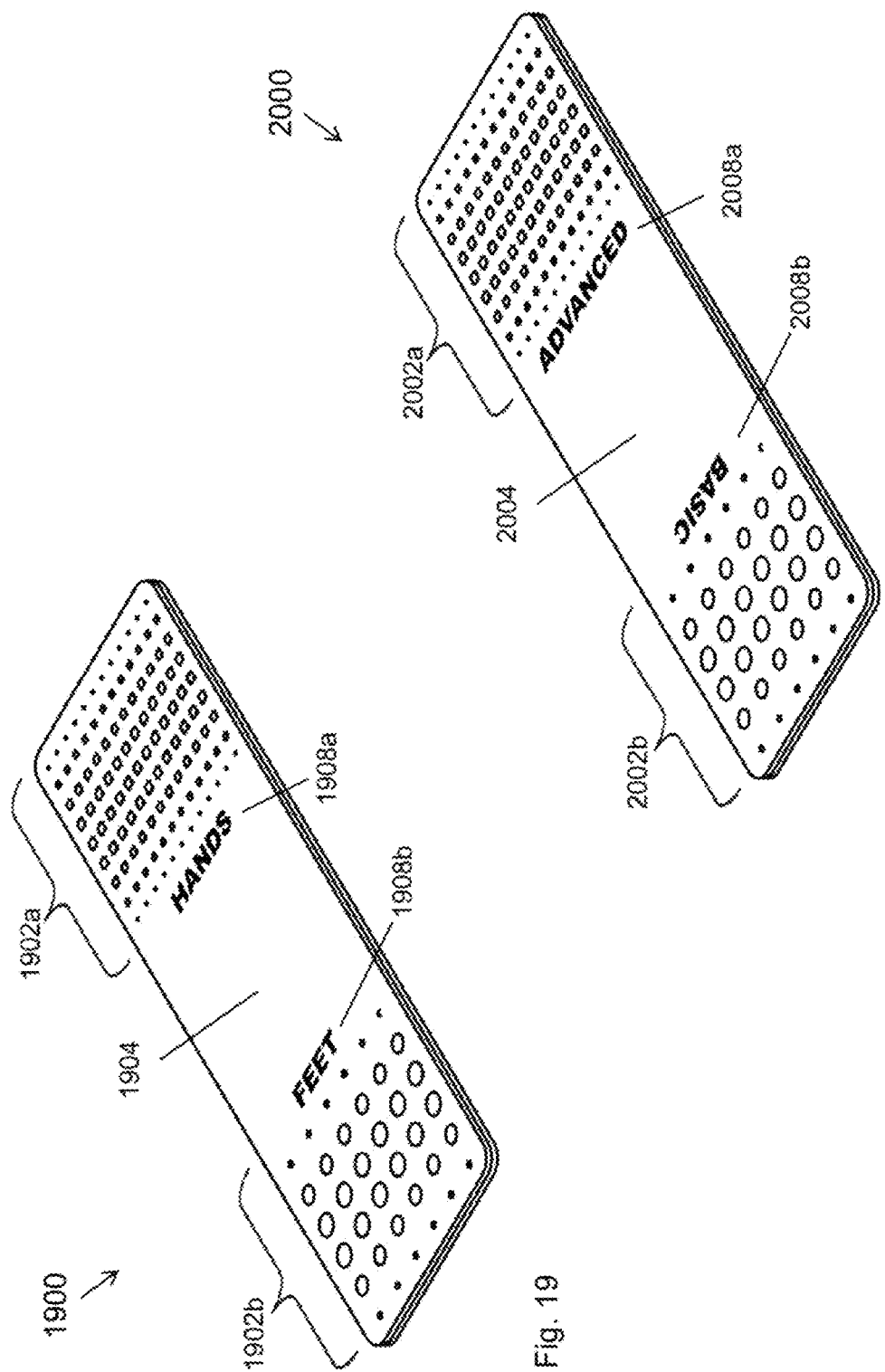

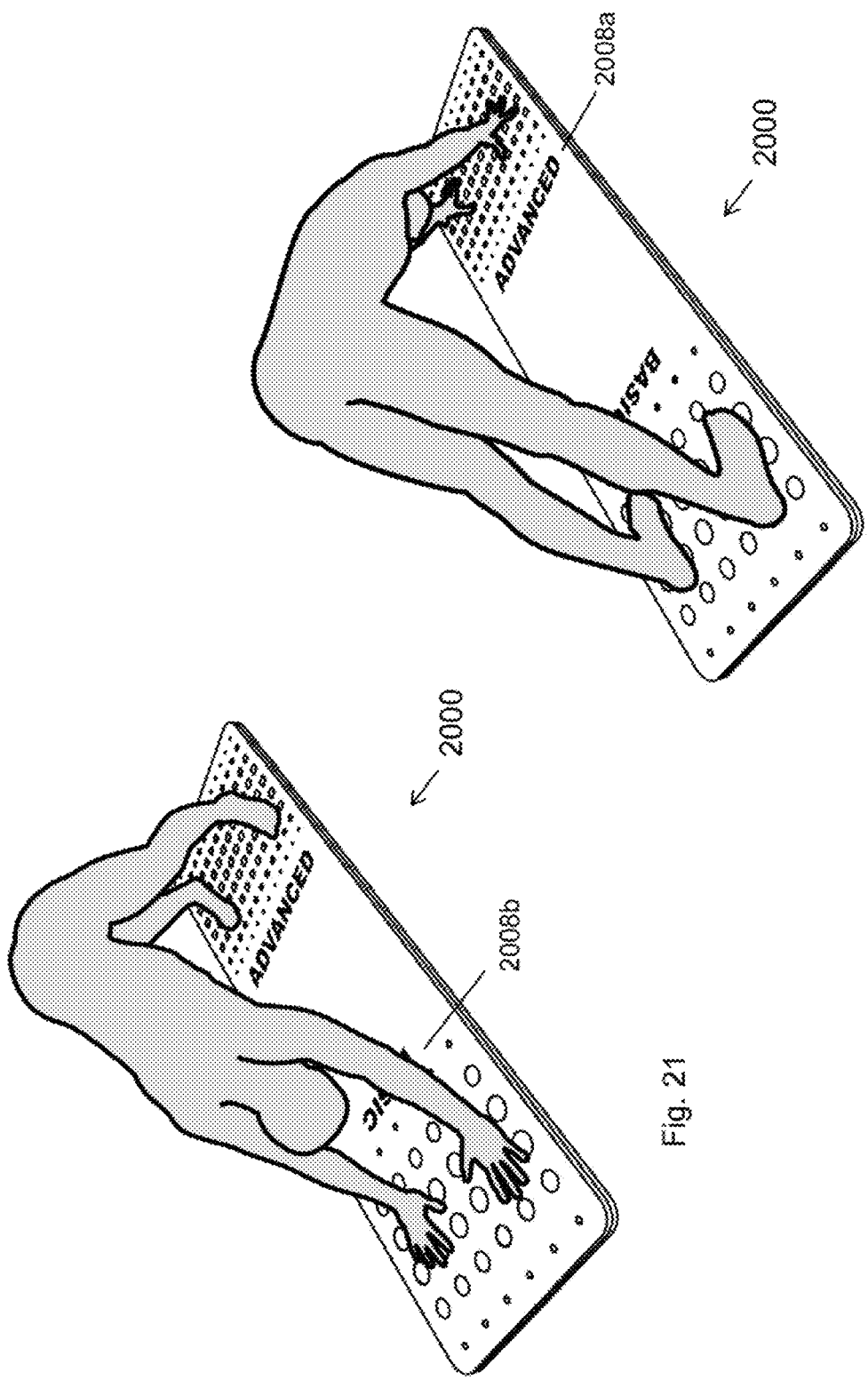

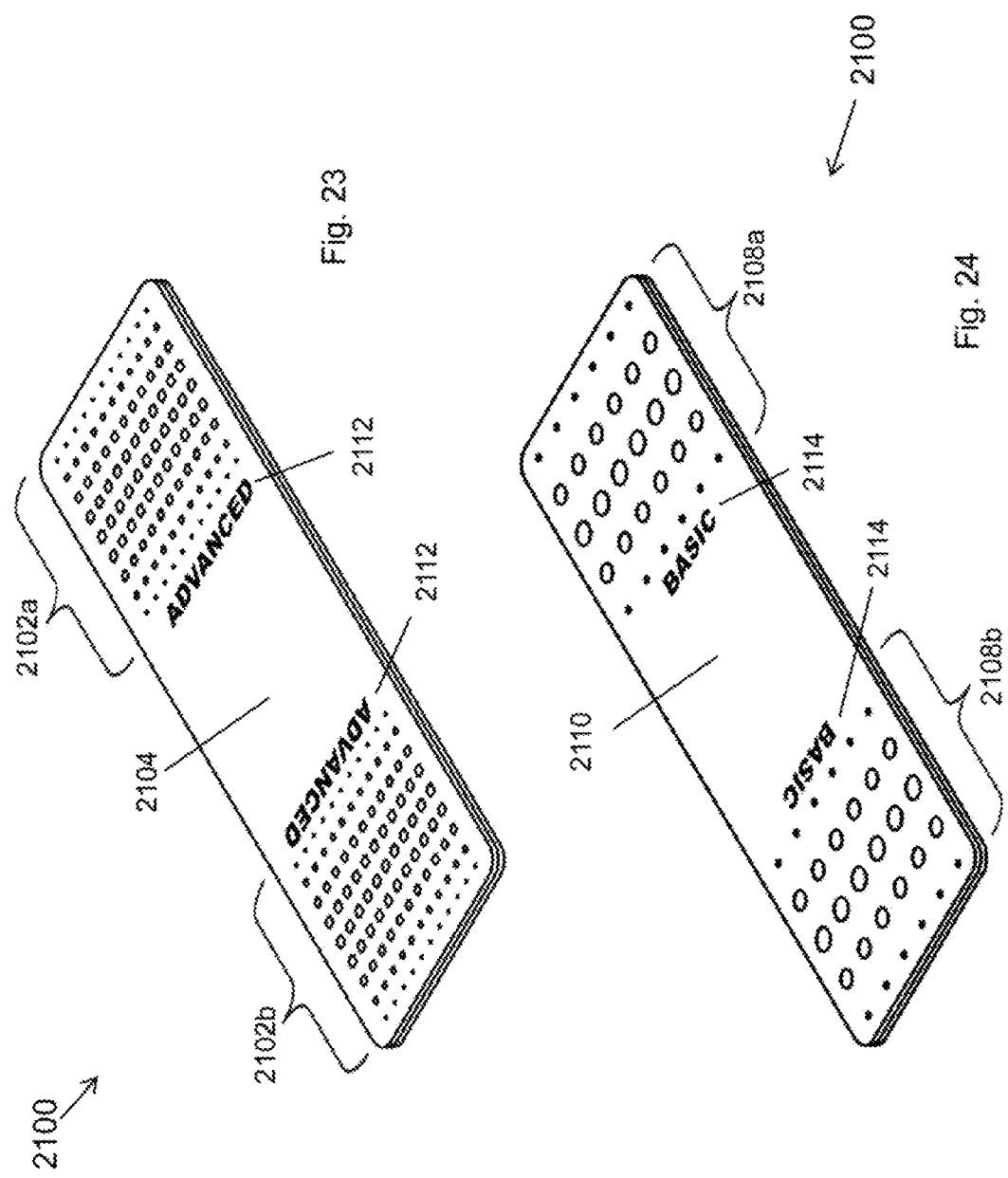

YOGA MAT WITH SUPPORT AND TRACTION

CROSS-REFERENCE TO RELATED APPLICATIONS

This application is a continuation-in-part of the following U.S. patent application, which is incorporated by reference in its entirety: U.S. patent application Ser. No. 13/193,789, filed Jul. 29, 2011. U.S. patent application Ser. No. 13/193,789 claims the benefit of the following provisional applications, each of which is hereby incorporated by reference in its entirety:

U.S. Provisional Application 61/369,656, filed Jul. 30, 2010; and U.S. Provisional Application 61/410,422, filed Nov. 5, 2010.

BACKGROUND

1. Field

The present disclosure generally relates to yoga accessories and more specifically to yoga mats and yoga towels.

2. Description of the Related Art

Yoga has become one of the popular ways and techniques of maintaining physical as well as mental health and fitness. The art of yoga has gained momentum, especially in the past decade, across the world with millions of people adopting it. This has led to a surge in the demand for yoga accessories such as yoga mats, yoga towels, and the like that may utilize modern manufacturing and design processes to create products with desired comfort levels, thereby meeting the requirements of a yoga accessory user (hereinafter referred to as the user).

With an increasing demand, several kinds of yoga mats have been designed, manufactured, and marketed. The existing designs of mats involve single or multiple layer construction that feature a uniform top side manufactured with a single material. A limitation of such mats is that they are unable to provide sufficient traction in certain areas of the mats. This traction is required to provide grip to the user. Better traction may be necessary, especially in performing yoga techniques such as Vinayasa yoga, Bikram yoga, and the like since users tend to sweat more due to an increased room temperature or vigorous practice. The sweating on the mat may significantly reduce the performance of the user and may also increase the likelihood of injuries due to slipping. Additionally, the single material construction of the mats does not fully address the varying requirements of the user during various yoga postures on different locations of the mats.

Some existing mat designs provide cushioning and grip on a top surface of the mat. In one such design, the grip is introduced by including patterns of protrusions and/or depressions on the top surface of the mat. In another mat design, two different materials are used in different portions of the mat to introduce grip in the mat. In this case, some areas on the mat, such as regions where the user's hand and feet come in contact with the mat, have grip elements that are formed of a high-traction material, whereas the rest of the mat body is formed of a low traction material so that the traction and grip are introduced in specific areas of the mat.

Conventionally, yoga towels have been used along with the mats in heated environments. These towels may be placed on top of the mats at various locations to facilitate absorption of sweat and prevent slipping due to the presence of sweat on body parts such as hands and feet. The existing towels are typically made of micro fibers. Some existing designs of the towels provide cushioning and grip on their top surfaces.

None of the existing designs for the mats and towels provides secure grip and stability during yoga poses, and smooth and unobstructed movements between yoga poses in a single product. In addition, no existing design uses the difference in the compressibility of the grip regions and the rest of the mat or towel body. Similarly, none of the existing designs for a grip apparatus provide secure grip and stability when pressure is applied, and smooth and unobstructed movement when pressure is released.

In accordance with the foregoing, there is a need for yoga mats and towels that may offer the required traction and stability to a user without compromising smooth movements between yoga poses. Similarly, there is a need for a grip apparatus that may offer traction and stability when pressure is applied without compromising smooth, unobstructed movement when pressure is removed, such as when changing grip positions. In addition, there is a need for a grip apparatus that may also absorb perspiration and prevent moisture from reaching the object being gripped.

SUMMARY

The present disclosure may provide a mat including a first layer that may be formed of a compressible first material. The first layer may comprise an upper surface with one or more first portions and one or more second portions. The mat may further include at least one opening formed through the first portions. Further, the mat may include at least one column that may be disposed in or proximate to the openings. The columns may be formed of a second material. Further, the second portions may be adapted to be depressed in a compressed configuration. Further, the columns may be adapted to provide either support to a body part in a direction perpendicular to the top surface of the first layer, or traction to a body part in a direction tangential to the first layer's top surface, or both, when the second portions are depressed.

The present disclosure may further provide a mat including a first layer that may be formed of a compressible first material. The first layer may include an upper surface with one or more first portions and one or more second portions. The mat may further include one or more openings formed through the first portions. Further, the mat may include one or more columns that may be disposed in or proximate to the openings. The columns may be formed of a second material. Further, the columns may be configured to be depressed in a compressed configuration. Further, the second portions may be adapted to provide traction to a body part in a direction tangential to the first layer's top surface when the columns are depressed.

The present disclosure may further provide a towel that may include an absorption layer that may be adapted to absorb moisture. The absorption layer may include a top surface with one or more first portions and one or more second portions. The towel may further include at least one compressible region of flexible fiber that is disposed on the first portions. The compressible regions of flexible fiber may be formed of a flexible first material. The towel may further include one or more columns that may be disposed on the second portions. The columns may be formed of a second material. Further, the columns may be adapted to provide either support to a body part in a direction perpendicular to the absorption layer's top surface, or traction to a body part in a direction tangential to the absorption layer's top surface, or both, when the compressible regions of flexible fiber are depressed.

The present disclosure may further provide a towel that may include an absorption layer adapted to absorb moisture. The absorption layer may include a top surface with one or more first portions and one or more second portions. The absorption layer may further include at least one compressible region of flexible fiber that is disposed on the first portions. The compressible regions of flexible fiber may be formed of a flexible first material. The towel may further include at least one column that may be disposed either in or proximate to at least one opening formed through the second portions. The columns may be formed of a second material. Further, the columns may be adapted to provide either support to a body part in a direction perpendicular to the absorption layer's top surface, or traction to a body part in a direction tangential to the absorption layer's top surface, or both, when the compressible regions of flexible fiber are depressed.

In an aspect of the disclosure, a grip apparatus is provided. The grip apparatus may include a first layer formed of a compressible first material. The grip apparatus may further include an upper surface with one or more first portions and one or more second portions. The grip apparatus may further include at least one opening formed through the first portions. Further, the grip apparatus may include at least one column that may be disposed in or proximate to the openings. The columns may be formed of a second material. Further, either the second portions may be adapted to provide traction in a direction tangential to the first layer's upper surface when the columns, which are adapted to be compressed to a depressed configuration, are depressed, or the columns may be adapted to provide either support in a direction perpendicular to the upper surface of the first layer, or traction in a direction tangential to the first layer's upper surface, or both, when the second portion, which is adapted to be compressed to a depressed configuration, is depressed.

The present disclosure may further provide a grip apparatus that may include an absorption layer adapted to absorb moisture. The absorption layer may include a top surface with one or more first portions and one or more second portions. The absorption layer may further include at least one compressible region of flexible fiber that is disposed on the first portions. The compressible regions of flexible fiber may be formed of a flexible first material. The towel may further include at least one column that may be formed of a second material. The columns may also be disposed either on the second portions or in/proximate to openings formed through the second portions. The columns may be further adapted to provide either support in a direction perpendicular to the absorption layer's top surface, or traction to in a direction tangential to the absorption layer's top surface, or both, when the compressible region of flexible fiber is depressed.

In an aspect, a layered structure of a mat includes a top layer with a multiple of openings, a bottom layer, and a grip component including a multiple of columns with connecting segments therebetween, the connecting segments are disposed between the top layer and the bottom layer so that each of the columns extend at least partially through at least one of the multiple of openings. A portion of at least one of the multiple of columns is at least partially hollow. The grip component is formed of at least one of an elastomer and a flexible polymeric material. Each of the multiple of columns includes a flange. The connecting segments extend from the respective flange of each of the multiple of columns. The thickness of the connecting segments is equal to the thickness of the flanges. The thickness of the connecting segments is different from the thickness of the flanges. A top surface of the bottom layer has regions that correspond to the shape of at least one of the flanges and the connecting segments. A top surface of the bottom layer has regions that correspond to at least a portion of a thickness of at least one of the flanges and the connecting segments. The bottom surface of the top layer has regions that correspond to at least a portion of the shape of at least one of the flanges and of the connecting segments. The bottom surface of the top layer has regions that correspond to at least a portion of a thickness of at least one of the flanges and the connecting segments.

In an aspect, a grip component of a mat may include a multiple of columns, and a connecting web that connects the multiple of columns. The connecting web includes at least one of loosely-woven fibers, a woven fabric, a nonwoven fabric, and a thin sheet of material, wherein the thin sheet of material includes a plurality of openings stamped, cut or burned through. The multiple of columns may be molded with the connecting web. The multiple of columns may be affixed to the connecting web. The multiple of columns may be affixed via at least one of adhesive, a bonding process, and a printing process. The multiple of columns may be woven into the connecting web during the weaving process. The grip component may further include a top layer disposed adjacent to the grip component, the top layer having a multiple of openings, and a bottom layer bonded to said top layer such that each of the multiple of columns extend into a respective one of the multiple of openings. The grip component may be bonded to at least one of the top layer and bottom layer.

In an aspect, a grip zone of a mat may include a top layer with a plurality of openings, a bottom layer, and a grip component including columns and a connecting web that connects all the columns. The connecting web may include at least one of loosely-woven fibers, a woven fabric, a nonwoven fabric, and a thin sheet of material, with an array of openings stamped, cut or burned through. The columns may be molded or formed directly to the connecting web.

In an aspect, a layered structure of a mat may include a top layer with a multiple of first openings, a bottom layer with a multiple of second openings, a top grip component comprising a multiple of first columns, and a bottom grip component including a multiple of second columns, wherein the first columns and the second columns have different characteristics, and wherein the first columns extend at least partially through at least one of the multiple of first openings and the second columns extend at least partially through at least one of the multiple of second openings. The different characteristics comprise at least one of column size, column shape, top surface profile, material, construction and compressibility. The top grip component and the bottom grip component may be molded or formed of an elastomer or a flexible polymeric material. At least one of the top layer and the bottom layer has a higher compressibility than at least one of the first columns and the second columns.

In an aspect, a layered structure of a mat includes a top layer with a multiple of first openings, a bottom layer with a multiple of second openings, a grip component including a multiple of first columns and a multiple of second columns, wherein the first columns and the second columns have different characteristics, and wherein the first columns extend at least partially through at least one of the multiple of first openings and the second columns extend at least partially through at least one of the multiple of second openings. The different characteristics comprise at least one of column size, column shape, top surface profile, material, construction and compressibility. At least one of the top layer and the bottom layer has a higher compressibility than at least one of the first columns and the second columns.

In an aspect, a mat may include a top layer, and a bottom layer, wherein the top layer and the bottom layer are permanently bonded together to form the mat with a first end and a second end, wherein the first end and the second end have different grip characteristics. The mat may further include a grip component disposed between the top layer and the bottom layer, wherein at least a portion of the grip component extends partially through at least one of the top layer and the bottom layer.

In an aspect, a mat may include a first layered structure with a multiple of first openings, a first grip component with a multiple of first columns, each of said multiple of first columns extend at least partially through one of the multiple of first openings, and a second layered structure with a multiple of second openings, a second grip component with a multiple of second columns, each of said multiple of second columns extend at least partially through one of the multiple of second openings, wherein the first layered structure a includes a first characteristic and the second layered structure includes a second characteristic, the first characteristic different than the second characteristic. The mat may further include a first top layer adjacent to the first grip component and a second top layer adjacent to the second grip component, wherein the first top layer is more compressible than the second top layer. The mat may further include a first top layer adjacent to the first grip component and a second top layer adjacent to the second grip component, wherein the second top layer is more compressible than the first top layer. The mat may further include a first bottom layer adjacent to the first grip component and a second bottom layer adjacent to the first grip component, the first bottom layer more compressible than the second bottom layer. The mat may further include a first bottom layer adjacent to the first grip component and a second bottom layer adjacent to the second grip component, the second bottom layer more compressible than the first bottom layer. The first columns may be more compressible than the second columns. The second columns may be more compressible than the first columns. A top surface of the first columns may have a larger edge radii than a top surface of the second columns. A top surface of the second columns may have a larger edge radii than a top surface of the first columns. The first and second characteristic is at least one of layered structure size, layered structure shape, layered structure location, column size, column shape, column number, layered structure pattern, layered structure color, grip column top surface profile, top layer or bottom layer material, top layer or bottom layer characteristics, column material, column construction and column compressibility. A top surface of the mat includes at least one of textual cues, graphic symbols, colors, and diagrams proximate to the first and second layered structures to indicate the proper orientation for using the mat. The first and second characteristic indicates the proper orientation for using the mat. At least one of the first grip component, first columns, second grip component, and second columns includes a material of either a low durometer or a low density. At least one of the first grip component, first columns, second grip component, and second columns of the first layered structure and the second layered structure includes a material of either a medium to high durometer or a medium to low density. A top surface of at least one of the first and second grip columns has a small edge radii. The first layered structure includes a larger number of grip columns than the second layered structure. The first columns may be smaller than the second columns. A surface of one or more of the first columns facing the second layered structure may be concave. At least one of a top layer or a bottom layer of the first layered structure or the first columns may have a lower compressibility than a top layer or a bottom layer of the second layered structure or the second columns. A top surface of one or more of the first columns may be concave. A top surface of one or more of the first columns may have a larger edge radius than a top surface of one or more of the second columns. A surface of one or more of the second columns facing the first layered structure may be straight and normal to the direction of the first layered structure. A top surface of one or more of the second columns may be flat. A top surface of one or more of the second columns may be convex. At least one of the first layered structure and second layered structure includes at least one of a large number of columns, small-sized columns, a surface of one or more of the columns facing the second layered structure are concave, a top layer or a bottom layer or the columns have a low compressibility, a top surface of one or more of the columns are concave, and a top surface of one or more of the second columns has a large edge radius. At least one of the first layered structure and second layered structure includes at least one of a small number of columns, large-sized columns, a surface of one or more of the columns facing the opposite layered structure are straight and normal to the direction of the opposite layered structure, a top layer or a bottom layer or the columns have a high compressibility, a top surface of one or more of the columns are flat or convex, and a top surface of one or more of the columns has a small edge radius. At least one of the top layer and the bottom layer has a higher compressibility than at least one of the first columns and the second columns.

In an aspect, a mat may include a first layered structure, and a second layered structure; wherein said first layered structure includes a first characteristic, and the second layered structure includes a second characteristic, the first characteristic different from the second characteristic. Each of the first layered structure and the second layered structure includes a top layer with a multiple of first openings, a bottom layer with a multiple of second openings, a top grip component including a multiple of first columns, and a bottom grip component including a multiple of second columns. The first columns and the second columns may have different characteristics. The first columns may extend at least partially through at least one of the multiple of first openings and the second columns extend at least partially through at least one of the multiple of second openings. The first and second characteristic may be at least one of column size, column shape, top surface profile, material, construction and compressibility. The top grip component and the bottom grip component may be molded or formed of an elastomer or a flexible polymeric material. The number of first columns may be larger than the number of second columns. The first columns may be smaller than the second columns. A surface of one or more of the first columns may be concave. At least one of the top layer and the first columns may have a lower compressibility than at least one of the bottom layer and the second columns. A top surface of one or more of the first columns may have a larger edge radius than a top surface of one or more of the second columns. A surface of one or more of the second columns may be straight and normal to the direction of the opposite layered structure. A top surface of one or more of the second columns may be flat or convex. At least one of the top layer and the bottom layer has a higher compressibility than at least one of the first columns and the second columns.

In an aspect, a mat may include a first layered structure and a second layered structure, wherein each of the first layered structure and the second layered structure comprise a top layer with a multiple of first openings, a bottom layer with a multiple of second openings, and a grip component including a multiple of first columns and a multiple of second columns, wherein the first columns and the second columns have different characteristics, and wherein the first columns extend at least partially through at least one of the multiple of first openings and the second columns extend at least partially through at least one of the multiple of second openings. The different characteristics include at least one of column size, column shape, top surface profile, material, construction and compressibility. The top grip component and the bottom grip component may be molded or formed of an elastomer or a flexible polymeric material. The number of first columns may be larger than the number of second columns. The first columns may be smaller than the second columns. A surface of one or more of the first columns may be concave. At least one of the top layer and the first columns may have a lower compressibility than at least one of the bottom layer and the second columns. A top surface of one or more of the first columns may have a larger edge radius than a top surface of one or more of the second columns. A surface of one or more of the second columns may be straight and normal to the direction of the opposite layered structure. A top surface of one or more of the second columns may be flat or convex. At least one of the top layer and the bottom layer has a higher compressibility than at least one of the first columns and the second columns.

In an aspect, a non-transitory computer readable medium with an executable program, wherein the program instructs a microprocessor to perform the following steps, may include taking a sensor reading from at least one of a plurality of sensors disposed within at least one sensor region of a surface, in response to a user assuming one or more yoga poses on the surface; analyzing the sensor reading to generate a pressure map, and identifying a yoga mat from a plurality of yoga mats in response to the pressure map. The medium may further include transmitting the sensor reading to a computer using a communications facility integrated with the surface. The surface may be a yoga mat. The plurality of sensors may be at least one of affixed to the top of the surface, disposed beneath the surface, or integrated with the surface. The plurality of sensors may be adapted to detect forces normal to the surface. The plurality of sensors may be adapted to detect forces in the direction of at least one of a length and a width of the surface. The plurality of sensors may be adapted to detect pressures. The medium may further include receiving information from a user comprising at least one of an age, an amount of yoga experience, a gender, a frequency of yoga practice, and a type of yoga practiced, and using the information in at least one of the analyzing and the identifying step. The medium may further include displaying the pressure map to the user. The medium may further include detecting, based on the sensor reading, if the user does not have their hands and feet within the at least one sensor region or if the user is wearing shoes. Analyzing may include determining at least one of the size of the user's palms, the span of the user's hands and feet, the user's overall weight, the relative loads on the user's hands and feet and the relative tangential forces compared to the relative normal forces, if the user presses on the surface primarily with portions of the hand or with the entire hand when in certain yoga poses, if the user presses on the surface primarily with the toes or with the entire soles of the feet when in certain yoga poses, if the user has relatively well-developed core muscles, and if the user is relatively steady or unsteady when assuming the one or more yoga poses on the surface. Identifying includes matching a yoga mat with particular characteristics to the user, wherein the characteristics include at least one of grip zone size, grip zone shape, grip zone location, column size, column shape, column number, grip zone pattern, grip zone color, grip column top surface profile, top layer or bottom layer material, top layer or bottom layer characteristics, column material, column construction and column compressibility. The yoga mat may include two grip zones and the two grip zones may differ in at least one of the characteristics.

In an aspect, a mat may include a first layered structure and a second layered structure, wherein the first layered structure is on a first end of the mat and the second layered structure is on a second of the mat, wherein each of the first layered structure and the second layered structure comprise a top layer with a plurality of first openings, a bottom layer with a plurality of second openings, a top grip component including a plurality of first columns, and a bottom grip component including a plurality of second columns, and wherein the first columns extend at least partially through at least one of the plurality of first openings and the second columns extend at least partially through at least one of the plurality of second openings. The first columns and the second columns may have different characteristics. The top layer and the bottom layer may have different characteristics. At least one of the top layer and the bottom layer has a higher compressibility than at least one of the first columns and the second columns.

In an aspect, a mat may include a first layered structure including a top layer with a plurality of top openings, a bottom layer with a plurality of bottom openings, a top grip component including a plurality of top columns that extend at least partially through at least one of the plurality of top openings, and a bottom grip component including a plurality of bottom columns that extend at least partially through at least one of the plurality of bottom openings, said first layered structure located within a first end section of the mat, and a second layered structure including a second top layer with a plurality of second top openings, a second bottom layer with a plurality of second bottom openings, a second top grip component including a plurality of second top columns that extend at least partially through at least one of the plurality of second top openings, and a second bottom grip component including a plurality of second bottom columns that extend at least partially through at least one of the plurality of second bottom openings, said second layered structure located within a second end section of the mat. At least one of the top columns and second top columns includes at least one different characteristic as compared to at least one of the bottom columns and the second bottom columns. At least one of the top layer and the second top layer includes at least one different characteristic as compared to at least one of the bottom layer and the second bottom layer. At least one of the top layer, second top layer, bottom layer and the second bottom layer has a higher compressibility than at least one of the top columns, second top columns, bottom columns, and second bottom columns.

In an aspect, a mat may include a first layered structure comprising a top layer with a plurality of top openings, a bottom layer with a plurality of bottom openings, and a grip component including a plurality of top columns that extend at least partially through at least one of the plurality of top openings and a plurality of bottom columns that extend at least partially through at least one of the plurality of bottom openings, said first layered structure located within a first end section of the mat, and a second layered structure comprising a second top layer with a plurality of second top openings, a second bottom layer with a plurality of second bottom openings, and a second grip component including a plurality of second top columns that extend at least partially through at least one of the plurality of second top openings and a plurality of second bottom columns that extend at least partially through at least one of the plurality of second bottom openings, said second layered structure located within a second end section of the mat. At least one of the plurality of top columns or second top columns and at least one of the plurality of second columns or second bottom columns may have different characteristics. The different characteristics may include at least one of column size, column shape, top surface profile, material, construction and compressibility. The number of top columns may be larger than the number of bottom columns. At least one of the top columns and second top columns may be smaller than at least one of the bottom columns and second bottom columns. A surface of at least one of the top columns, second top columns, bottom columns, and second bottom columns may be concave. At least one of the top layer, second top layer, bottom layer, and second bottom layer may have a higher compressibility than at least one of the top columns, second top columns, bottom columns, and second bottom columns.

BRIEF DESCRIPTION OF THE FIGURES

The inventions disclosed herein and the following detailed description of certain embodiments thereof may be understood with reference to the following figures:

FIGS. 3A, 3B, and 3C depict a structural construction of a mat in an uncompressed configuration, in accordance with various embodiments of the present disclosure;

FIGS. 4A and 4B depict compressed and uncompressed configurations of a mat, in accordance with a first embodiment of the present disclosure;

FIGS. 5A and 5B depict compressed and uncompressed configurations of a mat, in accordance with a second embodiment of the present disclosure;

FIGS. 6A and 6B depict compressed and uncompressed configurations of a mat, in accordance with a third embodiment of the present disclosure;

FIGS. 7A and 7B depict compressed and uncompressed configurations of a mat, in accordance with a fourth embodiment of the present disclosure;

FIGS. 8A, 8B, and 8C depict the compressed and uncompressed configurations of a mat 800, in accordance with a fifth embodiment of the present disclosure;

FIGS. 9A, 9B, 9C, and 9D depict components of a mat, in accordance with a first embodiment of the present disclosure;

FIGS. 11A, 11B, and 11C depict components of a bottomless mat, in accordance with a third embodiment of the present disclosure;

FIGS. 12A and 12B depict the compressed and uncompressed configurations of a mat, in accordance with an embodiment of the present disclosure;

FIGS. 13A, 13B, and 13C depict compressed and uncompressed configurations of a towel, in accordance with an embodiment of the present disclosure;

FIG. 14 depicts coupling between a towel and a mat, in accordance with an embodiment of the present disclosure; and FIGS. 15A and 15B depict compressed and uncompressed configurations of a towel, in accordance with an embodiment of the present disclosure.

FIG. 16 depicts the compressed configuration of a grip apparatus during standing and stationary posture, in accordance with an embodiment of the present disclosure.

FIG. 19 depicts a perspective view of a mat, in accordance with various embodiments of the present disclosure.

FIG. 20 depicts a perspective view of a mat, in accordance with various embodiments of the present disclosure.

FIG. 21 depicts a perspective view of a mat being used in the proper orientation for basic users, in accordance with various embodiments of the present disclosure.

FIG. 22 depicts a perspective view of a mat being used in the proper orientation for advanced users, in accordance with various embodiments of the present disclosure.

FIG. 23 depicts a top perspective view of a mat, in accordance with various embodiments of the present disclosure.

FIG. 24 depicts a bottom perspective view of a mat, in accordance with various embodiments of the present disclosure.

DETAILED DESCRIPTION

Detailed embodiments of the present disclosure are disclosed herein; however, it is to be understood that the disclosed embodiments are merely exemplary of the inventions disclosed herein, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting, but rather to provide an understandable description of the disclosure.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "operatively coupled," as used herein, is defined as connected, although not necessarily directly and mechanically.

The present disclosure provides a mat and a towel for use in yoga. For example, the mat and towel may be used in a heated and cooled environment without compromising user performance. In various embodiments, the mat may include different areas with differentiated construction patterns based on varying requirements. In one embodiment, the mat may offer the required traction to a user without compromising gliding and other similar flow movements of the user. In another embodiment, the mat may offer traction to the user without compromising the comfort and portability of the mat. This may help in providing a neutral tactile feel to the user during yoga postures and movements between yoga postures, thereby avoiding any discomfort during yoga practice. Further, in some embodiments, the mat may deliver comfort and stability during stationary postures such as the challenging single-footed standing posture and the like.

Figure 1:
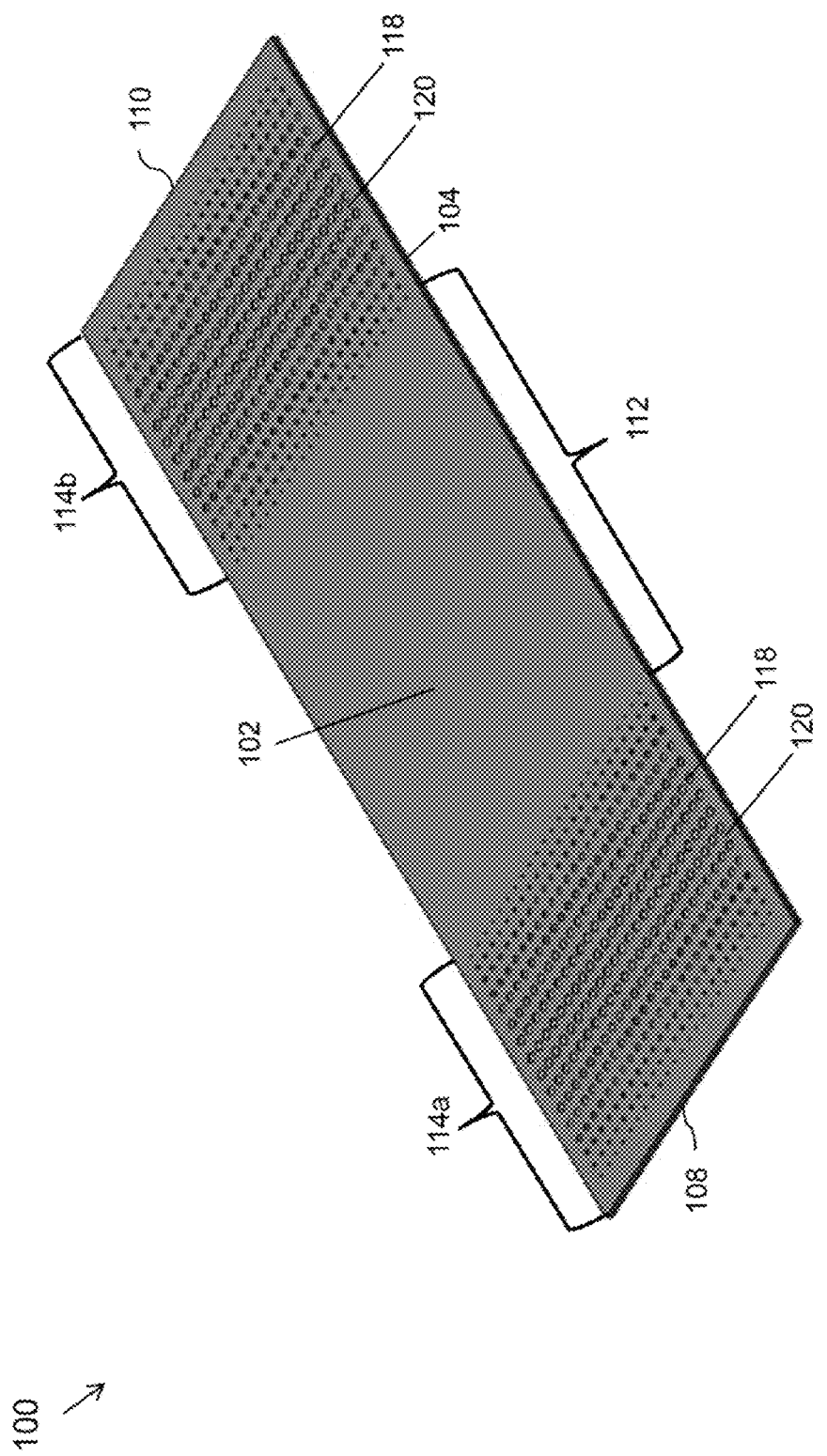
FIG. 1 depicts a perspective view of a mat, in accordance with an embodiment of the present disclosure.

FIG. 1 depicts a perspective view of a mat 100, in accordance with an embodiment of the present disclosure. The mat 100 may be a yoga mat or any other general purpose mat such as a floor mat. As shown in FIG. 1, the mat 100 includes a top surface 102. The mat 100 further includes a first layer 104, which may be made of a material such as compressible foam or any other material that is compressible, durable and light. The material may include polystyrene, polymethacrylimide, polyvinylchloride, polyurethane, polypropylene, polyethylene, NES, and the like. The foam-based first layer 104 may be capable of achieving the desired lightness and portability. A desired compressibility and cushioning effect may be achieved with the help of the foam-based first layer 104 within a limited weight, thereby adding portability to the mat 100. The foam material of the first layer 104 may be mixed with rubber or any other similar material to offer enhanced gripping properties. The first layer 104 may also be configured to achieve zero or limited sweat absorption to maintain sanitary conditions all the time even during heated yoga environments. The thickness of the first layer 104 may vary based on the requirements. Further, the hardness of the material constituting the first layer 104 may also vary in durometer and foam density based on the requirements.

As shown in FIG. 1, the mat 100 only includes a single layer, i.e., the first layer 104. Therefore, in this case, the top surface 102 of the mat 100 will be the same as the top surface of the first layer 104. It will be apparent to a person skilled in the art that the mat 100 may include any number of layers based on the requirement and utility of the mat 100. In one exemplary embodiment, the mat 100 may include a second layer that may be disposed below the first layer 104. In this case, the second layer may act as the base or the bottom layer of the mat 100. In another exemplary embodiment, a thin and/or uncompressible layer such as a waterproof coating or a thin fabric may be formed over the first layer 104. In this case, the first layer 104 may act as a base layer or intermediate layer and the thin and/or uncompressible layer may act as the topmost layer of the mat 100.

In various embodiments, the traction may be provided on the top surface 102 of the first layer 104 at certain areas of the mat 100. The areas may include the locations on the mat 100 that may frequently come in contact with feet, hands or other body parts of a user while performing the yoga exercises. In an exemplary embodiment, the hands and feet of the user may come in contact with an area of the mat 100 proximate to opposite ends 108 and 110 of the top surface 102 of the mat 100 during gliding sequences and poses. The top surface 102 of the mat 100 includes a low-traction surface 112 defined in the area proximate to the middle of the top surface 102 of the mat 100. The top surface 102 further includes one or more traction surface regions 114a and 114b defined in the areas proximate to the opposite ends 108 and 110, respectively, of the mat. The traction surface regions 114a and 114b may be configured to provide traction to the user's body parts such as the feet and hands that come in contact with these surfaces. The traction surface regions 114a and 114b may allow the user to glide during various yoga steps, while providing sufficient traction to the user's hands and feet in standing poses and while balancing. The added traction through the traction surface regions 114a and 114b may provide a neutral tactile feel to the user during movements and postures, thereby avoiding users from any feeling of unsteadiness, distraction, and frustration. Additionally, the traction surface regions 114a and 114b may be designed in such a way that they may provide stability (or support) to the user during standing and stationary postures, especially in a typical single-footed standing posture typical of yoga. In another embodiment, the traction surface regions 114a and 114b may be limited to an area proximate to one of the ends 108 or 110 of the mat 100 such that the weight of the mat 100 is kept to a minimum, thereby increasing its portability.

An area covered by the length and width of the traction surface regions 114a and 114b may be hereinafter referred to as a 'grip zone' for simplicity in the description. The length of the grip zone referring to a measure along the direction of the length of the mat 100 and the width of the grip zone referring to a measure along the direction of the width of the mat 100 may vary based on the requirement such as the height of the user, the type of yoga exercise, and the like.

In accordance with various embodiments, the traction surface regions 114a and 114b may be composed of a material or have a surface roughness that may offer frictional resistance to one or more body parts, which comes in contact with the top surface 102 of the mat 100, in a direction tangential to the top surface 102 of the mat 100 or the first layer 104. In an embodiment, rubber or any other elastomeric or grip-enabling material may be utilized in the traction surface regions 114a and 114b to introduce desired traction in the grip zone of the mat 100.

The top surface 102 of the first layer 104 in the grip zone may include one or more first portions 118 (i.e., portions in the grip zone that are circular in shape in FIG. 1). The top surface 102 of the first layer 104 in the grip zone other than the one or more first portions 118 forms one or more second portions 120. As shown in FIG. 1, the one or more second portions 120 are the portions on the top surface 102 of the first layer 104 in the grip zone that are disposed between the one or more first portions 118.

In certain embodiments, the first layer 104 and a layer including the low-traction surface 112 may be separate layers. In certain other embodiments, the first layer 104 and the traction surface regions 114a and 114b may be separate layers. In yet other embodiments, there may be an intermediate layer of material disposed between the first layer 104 and a bottom/base layer of the mat 100 to maintain stiffness and avoid stretching of the first layer 104 upon movement of the user over the mat 100.

In various embodiments, openings may be formed through the one or more first portions 118. In one embodiment, one or more columns formed of a thermoplastic elastomer (i.e., second material) such as a rubber or any other synthetic material may be disposed in the openings. For example, the columns may be disposed in the openings such that the top surfaces of the columns may be disposed substantially parallel to the top surface 102 of the first layer 104. In another example, the columns may be disposed in the openings such that the top surfaces of the columns may be disposed below the top surface 102 of first layer 104. Alternatively, in another embodiment, the columns may be disposed proximate to the openings. For example, some portion of a column may be disposed in the opening, while the remaining portion of the column may be disposed below the opening. In another example, some portion of the column may be disposed in the opening, while the rest portion may protrude outward, i.e., above the top surface 102 of first layer 104. Alternatively, in yet another embodiment, the columns may be disposed below the openings. In various embodiments, the top surfaces of the columns may be formed of a traction material that may offer traction higher or lower than that offered by the traction material used to form the one or more second portions 120. The selection of higher or lower traction may be based on the traction requirement.

In an embodiment, the openings may be single-sided holes such that the first layer 104 is uncut at one surface of the mat 100. For example, the one or more first portions 118 of the top surface 102 of the mat 100 may be cut to provide openings such that the bottom surface of the first layer 104 is left uncut. In another embodiment, the openings may be pass-through holes such that the one or more first portions 118 are cut from the top surface 102 to the bottom surface of the first layer 104. The openings may be configured to receive the columns fixedly, in accordance with an embodiment. The top surfaces of the columns may be disposed substantially parallel to the top surface 102 of the first layer 104 or may protrude outward or inward. The shape of the columns may be cylindrical, square, rectangular, or the like, with defined lengths and widths of the columns such that a traction pattern is created. The traction pattern may provide traction to the user's body parts contacting the grip zone of the mat 100. The traction pattern may be zigzag, puzzle, or the like. Alternatively, the traction pattern may be one or more continuous lines. In accordance with various embodiments, the configuration of the traction pattern may vary based on the requirements. The traction pattern may be uniform or non-uniform.

The openings may be created through the first layer 104 by various manufacturing and cutting processes such as die cutting, laser or water-jet cutting, gang-punching, and the like. The columns in or proximate to the openings may be compressed when the user applies pressure during standing poses or any other activity that involves contact of the user's body parts with the traction surface regions 114a and 114b. The configuration in which the pressure applied on any portion of the traction surface regions 114a and 114b (e.g., anywhere on the one or more second portions 120, the top surface of at least one column, or both) facilitates the one or more second portions 120, the top surface of at least one column, or both to be compressed is hereinafter referred to as a compressed configuration. In an embodiment, the columns and/or the second portions 120 may compress only when pressure applied on the traction surface regions 114a and 114b is the same as or above a threshold pressure, i.e., the pressure at which the columns and/or the second portions 120 begin to compress. In various embodiments, the material of the columns and/or the second portions 120 may be chosen to be of sufficient stiffness such that they will not compress until the threshold pressure is achieved. The stiffness (or compressibility) of the columns may also be affected by the structure of the underside of the columns, which could be hollow on their undersides with ribs in order to reduce weight, and/or by the stiffness (or compressibility) of the bottom layer of the mat 100. The amount of threshold pressure may vary based on the relative compressibility of the columns, the first layer 104, the bottom layer of the mat 100, relative heights of the columns, and the like.

The compressed configuration may provide either support (or stability) to the body parts that contact in a direction perpendicular to the top surface 102 of the first layer 104, or traction to the body parts that contact in a direction tangential to the top surface 102, or both. In other words, the support refers to the resistance to movement of the body parts in the direction perpendicular to the top surface 102 of the first layer 104, whereas the traction refers to the resistance to movement in a direction tangential to the first layer's top surface. In an embodiment where the one or more second portions 120 depresses more than the top surfaces of at least one column in the compressed configuration, these columns may engage with the hands/feet of the user to offer both support and traction. In various embodiments, the material used to form the columns may be harder and hence, less compressible, than the material used to form the first layer 104. The columns, being more rigid than the first layer 104, provide more stability/support than the cushioning first layer 104 when the columns engage with the hands/feet, thus improving the user's balance. This may allow the columns to provide the required support in the direction perpendicular to the top surface 102 of the first layer 104 since the columns will not depress significantly in the compressed configuration. The traction and support, thus developed under pressure, may still maintain a comfortable level for hands and feet while gliding over the grip zone of the mat 100. In other words, the mat 100 is able to offer the required traction and support to the user without compromising smooth movements between the yoga poses. Alternatively, in another embodiment where the one or more second portions 120 depresses less than the top surfaces of at least one column in the compressed configuration, the one or more second portions 120 may engage with the hands/feet of the user to offer only fraction to the hands/feet.

The traction may be provided based on any or all of the known factors, such as, but not limited to, the coefficient of friction (such as static friction and dynamic/sliding friction), surface texture/roughness, the edge contact and contact with the sides of the columns (in the compressed configuration). In other words, the traction may be affected by a combination of material properties and geometry.

Further, the configuration in which the columns and/or the second portions 120 are in uncompressed state (i.e., the pressure applied on the traction surface regions 114a and 114b is below the threshold pressure) is interchangeably referred to as an uncompressed configuration. In the uncompressed configuration, the top surfaces of some or all columns are configured to be disposed either below or coplanar to the top surface 102 of the first layer 104.

In accordance with an embodiment of the present disclosure, grip zones may be provided proximate to the opposite ends 108 and 110 of the top surface 102 of the mat 100 as depicted in FIG. 1. In another embodiment, grip zones may be provided on the entire top surface 102 of the mat 100 to provide additional traction.

The mat 100 may further include various patterns or textures based on varying requirements at different locations of the mat 100. In some embodiments, the top surface 102 of the mat 100 may be covered with a waterproofing layer that may block the sweat or perspiration from absorbing into the mat 100. In an embodiment, the waterproofing layer may be coated with an elastomer such as a rubber to provide traction. The waterproofing layer may include a texture for additional traction.

In accordance with an embodiment, a bottom surface of the mat 100 may be provided with a traction element or coating that may deliver traction to the entire bottom surface of the mat 100 for creating a binding impact between the mat 100 and the floor. In another embodiment, the bottom surface of the mat 100 may be provided with a texture to create such a binding impact between the mat 100 and the floor. This may protect the mat 100 from dislocating and may also keep it clean. Further, a layer or coating may be provided on the bottom surface to protect and maintain the cleanliness of the mat 100. In accordance with various embodiments of the present disclosure, antimicrobial treatment may be performed on the mat 100 to ensure the desired hygienic conditions. Antimicrobial agents that may kill or limit the growth of the microorganisms may be utilized in the antimicrobial treatment. In addition, an antimicrobial coating may be applied on the surface of the mat 100 that may kill or inhibit the growth of microorganisms.

The mat 100 may be customized based on the user's requirements and preferences. The hardness of foam or rubber may vary in durometer and/or density based on the user's preference. Similarly, the shape and size of the columns, openings, and the like may also vary. In accordance with an embodiment, the mat 100 may include two or more layers of foam to form the first layer 104. The top layer may be utilized to generate the traction pattern of the traction surface regions 114a and 114b, while the lower layers may act as a base. In another embodiment, a single layer may be utilized that may be die cut or embossed with columns of rubber and the like on the top surface of the layer or in openings formed through this top surface. The color of foam and rubber used to form the columns may be customized based on user preferences. The size of the traction surface regions 114a and 114b, pattern of rubber shapes, and their placement (e.g., depth) in or proximate to the openings may vary based on the requirements.

Figure 2:
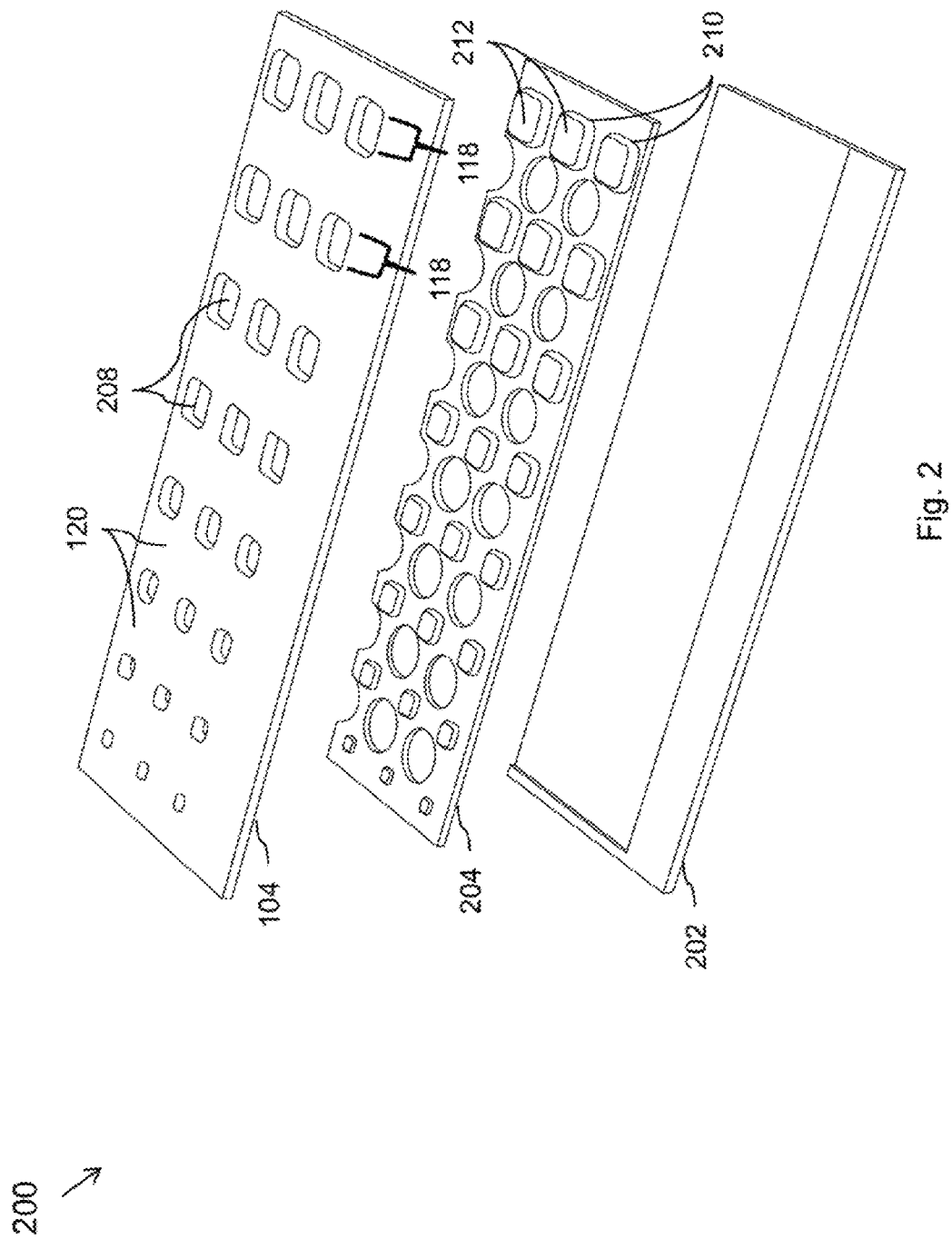
FIG. 2 depicts a perspective view of a layered structure of a grip zone of the mat of FIG. 1, in accordance with an embodiment of the present disclosure.

In accordance with various embodiments, the mat 100 may be manufactured in a layered manner with a plurality of layers disposed on top of one another in a stacked form. FIG. 2 depicts a perspective view of a layered structure 200 of the grip zone of the mat 100, in accordance with an embodiment of the present disclosure. As shown in FIG. 2, the first layer 104's grip zone and a second layer such as a bottom layer 202 are separated by an elastomeric grip component 204. In this embodiment, the first layer 104 acts as the topmost layer of the mat 100, while the bottom layer 202 acts as the base layer of the mat 100. In various embodiments, the first layer 104 has an array of openings 208 (hereinafter referred to as 'openings 208') formed through the one or more first portions 118 of the top surface 102 of the first layer 104. The elastomeric grip component 204 may include grip elements such as columns 210. The elastomeric grip component 204 is a thin layer of elastomer, which connects all the columns 210. Further, as shown in FIG. 2, the elastomeric grip component 204 is a rectangular-shaped component configured with the shape and size that match with that of the grip zone of the first layer 104. The similarity in the shapes and sizes facilitates in coupling the elastomeric grip component 204 through the bottom surface of the grip zone of the first layer 104 such that the columns 210 fix into (and outward on the top surface 102 of the first layer 104 when compressed) the openings 208 of the first layer 104. The columns 210 may be molded into any shape and size that may fit in or proximate to the openings 208.

The columns 210 may be formed of a high-traction material such that the top surfaces 212 of some or all of the columns 210 have a higher traction than the one or more second portions 120 of the top surface 102 of the first layer 104. In an uncompressed configuration, the top surfaces 212 of some or all of the columns 210 are configured to be disposed either below or coplanar to the top surface 102 of the first layer 104. The columns 210 may protrude through the openings 208 in the first layer 104 when sufficient pressure (i.e., on or above threshold pressure) is applied on the grip zone of the mat 100. In one embodiment, the one or more second portions 120 of the top surface 102 of the first layer 104, which is formed of the compressible material, may compress in response to the sufficient pressure applied by the hands and feet of the user, thereby exposing some or all the columns 210 above the top surface 102. This compressed configuration of the mat 100 facilitates the top surface 102 of the mat 100 to provide increased grip and traction to the user's hands and feet contacting the grip zone. Additionally, the columns 210, being more rigid than the first layer 104, provide more stability than the cushioning first layer 104 would by itself, thereby improving the user's balance on the mat 100. The traction and support, developed under pressure, may still maintain a comfortable level for hands and feet while gliding over the grip zone of the mat 100. Further, in an embodiment when the pressure is removed from the grip zone or the pressure applied is below the threshold pressure, the one or more second portions 120 may return to its original position and conceal the high-traction columns 210.

Alternatively, in another embodiment where the one or more second portions 120 depresses less than the top surfaces 212 of some or all of the columns 210 in the compressed configuration, the one or more second portions 120 may engage with the hands/feet of the user to offer only traction to the hands/feet. This will be described later in conjunction with FIGS. 6A and 6B.

In accordance with an embodiment of the present disclosure, the columns 210 and the top surface 102 of the first layer 104 may be fabricated from the same material such that the materials of the columns 210 and the first layer 104 only differ in hardness (durometer) or density. The variance in hardness or weight of the columns 210 and the first layer 104 may provide the required traction even with the use of similar materials. In an exemplary scenario, both the first layer 104 and the columns 210 may be fabricated from rubber. However, the hardness of the first layer 104 and the columns 210 may be varied to induce a traction pattern in the grip zone.

The multi-layer mat 100 may utilize various types of materials based on the requirements. In an exemplary scenario, the first layer 104 of the mat 100 may be fabricated from foam and the bottom layer 202 may be fabricated from rubber. Similarly, various other materials may be used to manufacture various layers of the mat 100. In an embodiment of the present disclosure, the bottom layer 202 may be less compressible than the first layer 104. In this case, the material used to form the bottom layer 202 may be harder and hence, less compressible, than the material used to form the first layer 104. This may allow the columns 210 to provide the required support since the columns 210 will not depress significantly in the compressed configuration.

It will be apparent to a person skilled in the art that the number of openings and columns represented in FIG. 2 is exemplary and any number of openings and columns may be applicable in accordance with various embodiments of the present disclosure. Also, the shapes and sizes of openings and columns are exemplary and any other shape and size can be deployed in a similar manner in accordance with the mat of the present disclosure.

In the embodiment described in conjunction with FIG. 2, the openings 208 are formed by cutting the top surface 102 of the first layer 104 such that the one or more first portions 118 are hollow and hence, some or all the columns 210 in the elastomeric grip component 204 may be fixed into the openings 208 through the bottom surface of the first layer 104. Alternatively, the columns may be provided individually in each opening formed through the top surface of the mat. FIGS. 3A, 3B, and 3C depict a structural construction of a mat 300 in an uncompressed configuration, in accordance with various embodiments of the present disclosure. In this embodiment, only a portion of a grip zone (similar to the grip zone of FIG. 1) of the mat 300 is disclosed. As shown in FIGS. 3A-3C, the mat 300 includes a first layer 302 and a bottom layer 304 disposed below the first layer 302 having a top surface 308. The top surface 308 of the first layer 302 in the grip zone may include a first portion 310. The top surface 308 of the first layer 302 in the grip zone other than the first portion 310 forms one or more second portions 312. As shown in FIGS. 3A-3C, the one or more second portions 312 are the portions on the top surface 308 of the first layer 302 in the grip zone that are disposed on the two sides of the first portion 310.

As depicted in FIG. 3A, a column 314 formed of an elastomer may be introduced into an opening 318 formed through the first portion 310 such that a lower surface of the column 314 extends to a bottom surface 320 of the first layer 302. As shown in FIG. 3A, a top surface 322 of the column 314 is curve shaped and a major portion of this top surface 322 is coplanar with the top surface 308 of the first layer 302. The minor portion of the top surface 322 of the column 314 is disposed below the top surface 308 of the first layer 302. Further, the column 314 has flanges 324 disposed under the first layer 302. The flanges 324 are thin sections of material that are disposed on either side of the column 314 to hold the column 314 in place or facilitate coupling of the column 314 to the sidewalls of the first layer 302. It will be apparent to a person skilled in the art that a plurality of columns (similar to the column 314) may be disposed individually in respective openings (similar to the opening 318) formed through respective first portions (similar to the first portion 310) of top surfaces of the first layer 302.

As depicted in FIG. 3B, a column 328 formed of an elastomer may be introduced into an opening 330 formed through the first portion 310 such that a lower surface of the column 328 extends through an opening in the bottom layer 304, thereby making the column 328 longer. As shown in FIG. 3B, a top surface 332 of the column 328 is curve shaped and a major portion of this top surface 332 is coplanar with the top surface 308 of the first layer 302. The minor portion of the top surface 332 of the column 328 is disposed below the top surface 308 of the first layer 302. Further, the column 328 has flanges 334 (similar to the flanges 324 of FIG. 3A) disposed under the first layer 302. FIGS. 3A-3C describe the placement of a single column in the opening. It will be apparent to a person skilled in the art that a plurality of columns (similar to the column 328) may be similarly disposed individually in openings (similar to the opening 330 and the opening in the bottom layer 304) formed through the respective first portions (similar to the first portion 310) of the top surfaces of the first layer 302.

As depicted in FIG. 3C, a column 338 may be introduced into an opening 340 formed through the first portion 310 such that a lower surface of the column 338 may substantially interface with the first layer 302 at certain depth, which is uncut at the bottom end. As shown in FIG. 3C, a top surface 342 of the column 338 is curve shaped and a major portion of this top surface 342 is coplanar with the top surface 308 of the first layer 302. The minor portion of the top surface 342 of the column 338 is disposed below the top surface 308 of the first layer 302. It will be apparent to a person skilled in the art that a plurality of columns (similar to the column 338) may be disposed individually in openings (similar to the opening 340) formed through the respective first portions (similar to the first portion 310) of the top surfaces of the first layer 302.

However, still various other embodiments, as described above, may also be possible without limitations. In an exemplary embodiment, the individual columns may be formed by pouring liquid elastomer into the openings of the first layer (such as 104 or 302) and curing the elastomer. This embodiment will be described in detail later in conjunction with FIGS. 5A and 5B.

In yet another embodiment, rubber in the form of a plurality of rubber dots may be embossed on the first layer 302 to form a traction surface (such as the one or more traction surface regions 114a and 114b) on the top surface 308 of the first layer 302. The embossed rubber dots may provide a raised design or relief on the first layer 302 of the mat 300. Embossing of the rubber dots may be done with the help of embossing dies or rollers or any other technique. In embodiments, embossing or providing traction pattern may channel moisture or sweat away from hands and feet of the user. Various patterns of the embossing dies and rollers may be utilized to accomplish a required design of the rubber dots on the mat 300. In another embodiment, rubber textured coating may be applied on the first layer 302 to form the traction surface. Similarly, in accordance with various other embodiments of the present disclosure, several other kinds of manufacturing techniques and processes may be utilized without limitations to form the traction pattern on the first layer 302. This embodiment of using the rubber embossing may be similarly applied to columns formed in or proximate to the openings (such as 318, 330, or 340) formed through the one or more first portions (such as 310) of the top surface 308 of the first layer 302.

In embodiments, the traction pattern may vary based on the requirements. In an embodiment, the traction pattern may be continuous. In another embodiment, the traction pattern may be discontinuous. For example, rubber shapes such as rubber dots or rubber columns may be disposed or embossed in the openings formed through the first portions of the top surface 308 of the first layer 302 in a continuous or discontinuous manner. Further, the size and/or shape of rubber such as dots or columns may vary. Still, in another embodiment, the size and/or shape of the rubber may be kept uniform.

Various embodiments described below in conjunction with FIGS. 4A and 4B to FIGS. 8A, 8B and 8C only disclose various detailed views of a grip zone of a mat (such as the grip zone of the mat 100).

FIGS. 4A and 4B depict compressed and uncompressed configurations of a mat 400, in accordance with a first embodiment of the present disclosure. As shown in FIGS. 4A and 4B, the mat 400 includes a first layer 402 having a top surface 408 and a bottom layer 404 disposed below the first layer 402. The top surface 408 of the first layer 402 in the grip zone may include one or more first portions 410. The top surface 408 of the first layer 402 in the grip zone other than the first portions 410 forms one or more second portions 412. As shown in FIGS. 4A and 4B, the second portions 420 are the portions on the top surface 408 of the first layer 402 in the grip zone that are disposed between the first portions 410.

As depicted in FIGS. 4A and 4B, a plurality of columns 414 formed of an elastomer may be introduced into openings 418 formed through the first portions 410. The columns 414 may have the top surfaces 420 that are coplanar to the top surface 408 of the first layer 402. Further, as shown in FIGS. 4A and 4B, a surface 422 defined by connecting the top surfaces 420 of the columns 414 is planar.

FIG. 4A depicts the uncompressed configuration in which either no pressure is applied on the grip zone or the pressure applied on the grip zone is below a threshold pressure. In an embodiment, the top surfaces 420 of the columns 414 and/or the second portions 412 may compress only when the pressure applied on the grip zone is the same as or above the threshold pressure, i.e., the pressure at which the columns and/or the second portions 412 begin to compress.

In an exemplary embodiment of the compressed configuration shown in FIG. 4B, the feet and/or hands of a user may apply the threshold pressure that triggers the compression of only the second portions 412, whereas the top surfaces 420 of the columns 414 remain in the uncompressed configuration. In various embodiments, the material of the second portions 412 may be chosen to be of sufficient stiffness such that they will not compress until the threshold pressure is achieved. The arrows shown in FIG. 4B represent the pressure applied on the grip zone. In the embodiment disclosed in FIG. 4B, the compression of the second portions 412 may facilitate the engagement of the columns 414 with the hands/feet of the user to offer both support and traction to the hands/feet. The support to the hands/feet may be provided in a direction perpendicular to the top surface 408 of the first layer 402. Also, the traction to the hands/feet may be provided in a direction tangential to the top surface 408. The traction and support, thus developed under pressure, may still maintain a comfortable level for hands and feet while gliding over the grip zone of the mat 400. In other words, the mat 400 is able to offer the required fraction and support (i.e., in the compressed configuration) to the user without compromising smooth movements between the yoga poses (i.e., in the uncompressed configuration).

Further, when the pressure is removed from the grip zone or the pressure applied is below the threshold pressure, the second portions 412 may return to their original positions and conceal the columns 414 as illustrated in FIG. 4A.

FIGS. 5A and 5B depict compressed and uncompressed configurations of a mat 500, in accordance with a second embodiment of the present disclosure. Various elements or configurations in this embodiment are the same as that disclosed in conjunction with FIGS. 4A and 4B, except that columns 502 are constructed differently. The individual columns 502 are formed by pouring the liquid elastomer into the openings 418 and curing the elastomer. As a result, the sides of the columns 502 are bonded to the sides of the openings 418. Further, as illustrated in FIG. 5B, the sides of the openings 418 are only partially compressed and thus, only a small portion of the columns 502 is exposed to the top surface 408 of the first layer 402 when subjected to pressure equal to or greater than the threshold pressure. However, portions of the individual second portions 412 of the top surface 408 of the first layer 402 surrounding the columns 502 compress such that the columns 502 protrude further than the surrounding portions of the individual second portions 412, thereby providing increased grip and traction. Further, when the pressure is removed from the grip zone or the pressure applied is below the threshold pressure, the second portions 412 may return to their original positions and conceal the columns 502 as illustrated in FIG. 5A. As shown in FIGS. 5A and 5B, the surface 422 defined by connecting the top surfaces 420 of the columns 414 is planar.

FIGS. 6A and 6B depict compressed and uncompressed configurations of a mat 600, in accordance with a third embodiment of the present disclosure. Various elements or configurations in this embodiment are the same as that disclosed in conjunction with FIGS. 4A and 4B, except that columns 602 are formed of a material that is more compressible than the material used to form the second portions 412 of the top surface 408 of the first layer 402. As a result, as illustrated in FIG. 6B, top surfaces of the columns 502 depress or compress more than the second portions 412 in response to the pressure applied on the grip zone. In one embodiment, the threshold pressure at which the columns 502 may begin to compress may be different from the threshold pressure at which the second portions 412 may begin to compress. Alternatively, in another embodiment, the threshold pressures for both the columns 502 and the second portions 412 may be the same; however, the columns 502 may compress more than the second portions 412 at the same threshold pressure due to the difference in their materials. As shown in FIG. 6B, the top surfaces of the columns 602 are below the second portions 412, thereby exposing the edges of the openings 418. Therefore, when the user's hands or feet contact these edges, improved traction is provided in a direction tangential to the top surface 408 of the first layer 402.

Further, when the downward pressure is removed or it is below the threshold pressure, the top surfaces of the columns 602 may return to their original positions, concealing the edges of the openings 418 as illustrated in FIG. 6A. This enables the user to perform smooth and unobstructed movement between the yoga poses over the mat 600. In the embodiment described in conjunction with FIGS. 6A and 6B, the top surfaces of some or all of the columns 602 may have a lower traction than that of the second portions 412. As shown in FIGS. 6A and 6B, the surface 422 defined by connecting the top surfaces 420 of the columns 414 is planar.

FIGS. 7A and 7B depict the compressed and uncompressed configurations of a mat 700, in accordance with a fourth embodiment of the present disclosure. Various elements or configurations in this embodiment are the same as that disclosed in conjunction with FIGS. 4A and 4B, except that the top surfaces of columns 702a-k have different shapes. As shown in FIGS. 7A and 7B, a surface 704 defined by connecting the top surfaces of the columns 702a-k is represented by a contoured line (non-planar). In this embodiment, top surfaces of the columns 702a-k depress or compress less than the second portions 412 in response to the pressure applied on the grip zone. In one embodiment, the threshold pressure at which the columns 702a-k may begin to compress may be different from the threshold pressure at which the second portions 412 may begin to compress. Alternatively, in another embodiment, the threshold pressures for both the columns 702a-k and the second portions 412 may be the same; however, the columns 702a-k may compress less than the second portions 412 at the same threshold pressure due to the difference in their materials. As shown in FIG. 7B, which represents the compressed configuration, the top surfaces of the columns 702a-k are above the second portions 412. Even in the compressed configuration, the columns 702*a-k* define the contoured surface 704, in which the heights of the top surfaces of the columns 702*a-k* are different. In various embodiments, the contoured surface 704 may provide a more comfortable and stable surface for yoga positions.

FIGS. 8A, 8B, and 8C depict the compressed and uncompressed configurations of a mat 800, in accordance with a fifth embodiment of the present disclosure. Various elements or configurations in this embodiment are the same as that disclosed in conjunction with FIGS. 4A and 4B, except that a first set of columns 802 and a second set of columns 804 have different heights. As shown in FIG. 8A, which represents the uncompressed configuration of the mat 800, the first set of the columns 802 are at a height lower than the height of the second set of columns 804. As shown in FIGS. 8A-8C, a surface 808 defined by connecting the top surfaces of the columns 802 and 804 is represented by a staggered line (non-planar). In this embodiment, only the second portions 412 compress in response to the pressure applied on the grip zone. FIG. 8B represents the case in which a pressure P1 applied on the grip zone is the same as or above the threshold pressure at which the second portions 412 begin to compress. The pressure P1 results in the second set of columns 804 to be triggered and hence, only the second set of columns 804 protrude above the top surface 408 of the first layer 302. Further, FIG. 8C represents the case in which a pressure P2 is applied on the grip zone. In an embodiment, the pressure P2 may be greater than the pressure P1 and may trigger the first set of columns 802 (in addition to the second set of columns 804). As shown in FIG. 8C, both the first and second sets of columns 802 and 804 protrude above the top surface 408 of the first layer 302. Even in the compressed configuration, the columns 802 and 804 define the staggered surface 808 in which the heights of the columns 802 and 804 are different. Therefore, the staggered surface 808 facilitates in effectively varying the column density based on the applied pressure so that only some columns (i.e., the second set of columns 804) are activated under light pressure, and all the columns (i.e., the columns 802 and 804) are activated under greater pressure.

FIGS. 9A, 9B, 9C, and 9D depict components of a mat 900, in accordance with a first embodiment of the present disclosure. The mat 900 includes a first layer 902 (FIG. 9A) and a bottom layer 904 (FIG. 9B). The first layer 902 includes a top surface 908. The first layer 902 may be made of a material such as compressible foam or any other material that is durable and light. Further, the hardness of the material constituting the first layer 902 may also vary in durometer and foam density based on the requirements. Further, the bottom layer 904 may be made of the same material (i.e., compressible foam or any other material that offers durability and lightness) as that is used to form the first layer 902. The thickness of the first layer 902 and the bottom layer 904 may vary based on the requirements. In an exemplary embodiment, the thickness of the first layer 902 and the bottom layer 904 may each be 2 to 4 millimeters (mm).

The top surface 908 of the first layer 902 may include one or more first portions 910 (shown by dashed lines in FIGS. 9A and 9D). The top surface 908 of the first layer 902 in the grip zones (other than the one or more first portions 910) forms one or more second portions 912. As shown in FIG. 9A, the second portions 912 are the portions on the top surface 908 of the first layer 902 in the grip zone that are disposed between the first portions 910. In various embodiments, openings 914 may be formed through the one or more first portions 910. As shown in FIG. 9C, the mat 900 further includes a first elastomeric grip component 918 and a second elastomeric grip component 920. The first elastomeric grip component 918 is a thin layer of elastomer, which connects grip elements such as columns 922. Similarly, the second elastomeric grip component 920 connects columns 924. It will be apparent to a person skilled in the art that although FIG. 9C illustrates only four columns in each elastomeric grip component, any number of columns may be connected in each such component. Also, it will be apparent to a person skilled in the art that any number of elastomeric grip components may be used in various embodiments of the present disclosure. Further, as shown in FIG. 9D, the first and second elastomeric grip components 918 and 920 (of a specific shape and size) are configured in such a manner that their major portions may fit into the openings 914 formed in the first layer 902 and the remaining portions may fix into first and second embossed regions 928 and 930 in the bottom layer 904. The columns 922 and 924 may be molded into any shape and size that may fit into the openings 914 and the first and second embossed regions 928 and 930.

It will be apparent to a person skilled in the art that the mat 900 may include any number of layers based on the requirement and utility of the mat 900.

Figure 10A:
FIGS. 10A, 10B, and 10C depict components of a bottomless mat, in accordance with a second embodiment of the present disclosure.
Figure 10B:
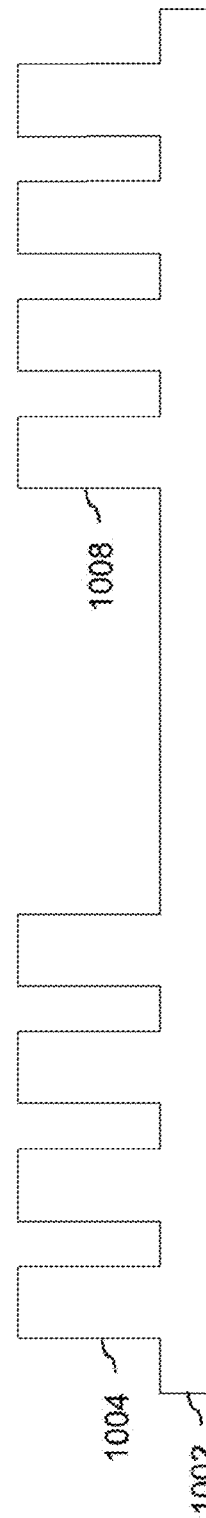
Figure 10C:
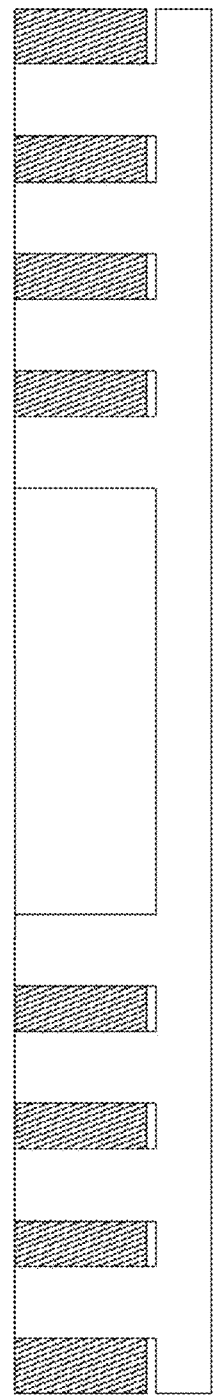

FIGS. 10A, 10B, and 10C depict components of a bottomless mat 1000 (hereinafter the mat 1000), in accordance with a second embodiment of the present disclosure. The mat 1000 is referred to as bottomless since it is formed of a single layer (i.e., the first layer 902) without the need of a bottom layer. Various elements (in terms of their functionalities and configurations) disclosed in FIG. 10A are the same as that in FIG. 9A, except that the thickness of the first layer 902 of the mat 1000 may be greater than that of the first layer 902 of the mat 900. In an exemplary embodiment, the thickness of the first layer 902 may be 3 to 6 mm.

As shown in FIG. 10B, the mat 1000 further includes an elastomeric grip component 1002, which is a thin layer of elastomer connecting grip elements such as a first set of columns 1004 and a second set of columns 1008. It will be apparent to a person skilled in the art that although FIG. 10B illustrates only four columns in each set of columns, any number of columns may be used. Further, as shown in FIG. 10C, the elastomeric grip component 1002 (of a specific shape and size) is configured in such a manner that it may fit into the openings 914 formed in the first layer 902 and the bottom of the elastomeric grip component 1002, thereby covering the entire bottom of the mat 1000. In various embodiments, the first and second sets of columns 1004 and 1008 may be molded into any shape and size that may fit into the openings 914.

FIGS. 11A, 11B, and 11C depict components of a bottomless mat 1100 (hereinafter the mat 1100), in accordance with a third embodiment of the present disclosure. The mat 1100 is referred to as bottomless since it is formed of a single layer (i.e., the first layer 902) without the need of a bottom layer. Various elements (in terms of their functionalities and configurations) disclosed in FIG. 11A are the same as that in FIG. 9A, except that the first layer of the mat 1100 also includes first and second embossed regions 1102 and 1104, and the thickness of the first layer 902 of the mat 1100 may be greater than that of the first layer 902 of the mat 900 or 1000. The greater thickness of the first layer 902 of the mat 1100 may be attributed to the first and second embossed regions 1102 and 1104 that cover the additional space in the first layer 902. In an exemplary embodiment, the thickness of the first layer 902 may be 4 to 8 mm.

FIG. 11B illustrates the first elastomeric grip component 918 and the second elastomeric grip component 920 as described and illustrated in FIG. 9C. Further, as shown in FIG. 11C, the first and second elastomeric grip components 918 and 920 (of a specific shape and size) are configured in such a manner that their major portions may fit into the openings 914 formed in the first layer 902 and the remaining portion (bottom portion of these components) may fix into first and second embossed regions 1102 and 1104 in the first layer 902. The columns 922 and 924 may be molded into any shape and size that may fit into the openings 914 and the first and second embossed regions 1102 and 1104.

It will be apparent to a person skilled in the art that any other design (shape and/or size) of the mat and its components is possible without deviating from the scope of the present disclosure.

FIGS. 12A and 12B depict the compressed and uncompressed configurations of a mat 1200, in accordance with an embodiment of the present disclosure. FIG. 12A depicts the uncompressed configuration of the mat 1200. Various elements (in terms of in their functionalities and configurations) disclosed in FIG. 12A are the same as that in FIG. 4A, except that a traction layer 1202 (shown by straight vertical lines in FIGS. 12A and 12B) is disposed between the first layer 402 and the bottom layer 404. Since the traction layer 1202 may function as, and may in fact be, a single column disposed proximate to the openings 418 of the first layer 402, in FIG. 12A there are no columns 414 disposed in the openings 418 as shown in FIG. 4A. The traction layer 1202 is formed of an elastomer (similar to the columns 414 in FIG. 4A) and may be introduced below the openings 418 formed through the first portions 410.

The traction layer 1202 may be formed of a high-traction material such that the top surface of the traction layer 1202 has a higher traction than the one or more second portions 120 of the top surface 102 of the first layer 104. In various embodiments, the traction layer 1202 may be formed of a material that is less or equally compressible than the material used to form the second portions 412 of the top surface 408 of the first layer 402. In an exemplary embodiment as illustrated in FIG. 12B, the top surface of the traction layer 1202 depresses or compresses to the same level as does the second portions 412 in response to the pressure applied on the grip zone. The arrows shown in FIG. 12B represent the pressure applied on the grip zone. In the compressed configuration, the user's hands or feet may contact some portion of the traction layer 1202 that is exposed to the user's hands or feet through the openings 418. This may result in the mat 1200 offering both support and traction to the hands/feet of the user. The fraction and support, thus developed under pressure, may still maintain a comfortable level for hands and feet while gliding over the grip zone of the mat 1200.

Further, another objective of the present disclosure is to provide a towel that may offer the required traction and stability to a user without compromising smooth movements between yoga poses. In various embodiments, the towel may be disposed above any of the mats described above. In one embodiment, the towel may be any ordinary towel. In another embodiment, the towel used may be the towel as described below in conjunction with FIGS. 13A-13C and FIGS. 15A-15B. In yet another embodiment, the towel disposed above the mat may be wet. In any case, the mat may provide the required traction and support to the user's hands/feet using the columns that may provide traction/support even through the towel.

FIGS. 13A, 13B, and 13C depict compressed and uncompressed configurations of a towel 1300, in accordance with an embodiment of the present disclosure. FIGS. 13A and 13B depict the uncompressed configuration of the towel 1300, whereas the FIG. 13C depicts the compressed configuration. In one embodiment, the towel 1300 may be placed on top of a mat (such as the mat 100) at various points to absorb sweat and prevent slipping of body parts during yoga practice. Alternatively, in another embodiment, the towel 1300 may be used as a standalone product such as, but not limited to, a bath towel. Various embodiments described below in conjunction with FIGS. 13A, 13B, and 13C to FIGS. 14A and 14B only disclose various detailed views of a grip zone of a towel (such as the grip zone of the mat 100). The towel 1300 includes an absorption layer 1302 adapted to absorb moisture and compressible regions 1304 of flexible fiber 1306 formed of a flexible first material. In an exemplary embodiment, the flexible first material may be any of a number of natural and synthetic materials commonly used in woven or non-woven fabrics.

The absorption layer 1302 has a top surface 1308. As shown in FIGS. 13A-13C (the compressible regions 1304 of flexible fiber 1306 is not shown in FIG. 13A for clarity purposes), the top surface 1308 of the absorption layer 1302 is same as the top surface of the towel 1300 since the absorption layer 1302 is the topmost layer in this embodiment. The top surface 1308 of the absorption layer 1302 in the grip zone may include one or more first portions 1310. The top surface 1308 of the absorption layer 1308 in the grip zone other than the one or more first portions 1310 forms one or more second portions 1312. As shown in FIGS. 13A-13C, the second portions 1312 are the portions on the top surface 1308 of the absorption layer 1308 in the grip zone that are disposed between the first portions 1310. As shown in FIG. 13B, the compressible regions 1304 of flexible fiber 1306 are disposed on the one or more first portions 1310. In accordance with various embodiments, the compressible regions 1304 of flexible fiber 1306 may be of loop weaves, fiber pile, flocking, or the like. The flexible fiber 1306 may facilitate the absorption of moisture/sweat owing to a large surface area exposed to the moisture/sweat. The flexible fiber 1306 may also provide a soft touch to the user. It must be appreciated by a person skilled in the art that though the flexible fibers 1306 are shown as straight lines, various other shapes of the flexible fibers 1306 such as circular, semi-circular, and the like may also be possible without limiting the spirit and scope of the present disclosure.

Further, the towel 1300 includes one or more columns 1318 disposed on the one or more second portions 1312. Between the compressible regions 1304 of flexible fiber 1306 are portions where the fiber is abbreviated or cut to create the relief pattern that in turn provides a surface (such as the one or more second portions 1312) upon which the traction material such as the one or more columns 1318 may be applied. The one or more columns 1318 may be made of a second material such as a woven fabric, a non-woven fabric, an elastomer, or the like. The shape of the one or more columns 1318 may be cylindrical, square, rectangle, or the like, with defined lengths and widths of the columns such that a traction pattern is created. The traction pattern may provide traction to the user's body parts contacting the grip zone of the towel 1300. In accordance with various embodiments, the configuration of the fraction pattern may vary based on the requirements. The traction pattern may be uniform or non-uniform. FIGS. 13A-13C illustrate one of the exemplary embodiments, in which the shape of the one or more columns 1318 is rectangular.

The one or more columns 1318 include top surfaces 1320 that may be configured to be disposed below one or more portions of top surfaces 1322 of the compressible regions 1304 of flexible fiber 1306 in the uncompressed configuration. The configuration in which the compressible regions 1304 of flexible fiber 1306 are in an uncompressed state (i.e., the pressure applied on the grip zone is below the threshold pressure) is interchangeably referred to as an uncompressed configuration. FIG. 13B illustrates one of the exemplary embodiments, in which the top surfaces 1320 of the one or more columns 1318 are disposed below the top surfaces 1322 of the compressible regions 1304 of flexible fiber 1306. As shown in FIG. 13B, a surface 1324 defined by connecting the top surfaces 1320 of the one or more columns 1318 is planar. However, a towel having a non-planar surface may be similarly deployed without limiting the scope of the present disclosure. The non-planar surface of the towel in that case will be similar to that described above in various embodiments of the mat (such as the mat 700 or 800).

Further, FIG. 13C illustrates the compressed configuration in which the compressible regions 1304 of flexible fiber 1306 are configured to be depressed or compressed when a user applies pressure during standing poses or any other activity that involves contact of the user's body parts with the grip zone. The configuration in which the pressure applied on any portion of the grip zone facilitates the compressible regions 1304 of flexible fiber 1306 to be compressed is hereinafter referred to as a compressed configuration. As shown in FIG. 13C, the top surfaces 1320 of the one or more columns 1318 are configured to be disposed above the top surfaces 1322 of the compressible regions 1304 of flexible fiber 1306 due to the applied pressure. The arrows shown in FIG. 13C represent the pressure applied on the grip zone. In an embodiment, the compressible regions 1304 of flexible fiber 1306 may compress only when pressure applied on the grip zone is the same as or above a threshold pressure, i.e., the pressure at which the compressible regions 1304 of flexible fiber 1306 begins to compress. In various embodiments, the material, shape, thickness and density of the flexible fibers 1306 may be chosen such that the compressible regions 1304 of flexible fiber 1306 will not compress until the threshold pressure is achieved.

The compressed configuration may provide support (or stability) to the body parts that contact in a direction perpendicular to the top surface 1308 of the absorption layer 1308, and traction to the body parts that contact in a direction tangential to the top surface 1308. The support and traction are provided using the fraction pattern created by the one or more columns 1318, which may engage with the hands/feet of the user in the compressed configuration. The traction and support, thus developed under pressure, may still maintain a comfortable level for hands and feet while gliding over the grip zone of the towel 1300. In other words, the towel 1300 is able to offer the required traction and support to the user without compromising smooth movements between the yoga poses.

The perspective view of the towel 1300 may be similar to the mat 100, except that the towel 1300 includes the absorption layer 1302 adapted to absorb moisture (instead of the first layer 104), and the one or more columns 1318 disposed on the one or more second portions 1312 of the top surface of the absorption layer (instead of being disposed in or proximate to the openings formed through the one or more first portions 118). Additionally, the towel 1300 also includes the compressible regions 1304 of flexible fiber 1306. The towel 1300 may include the grip zones provided proximate to the opposite ends of the top surface 1308 of the absorption layer 1302 (similar to the opposite ends 108 and 110 of the top surface 102 of the mat 100). In another embodiment, the grip zones may be provided on the entire top surface 108 to provide additional traction.

The one or more columns 1318 may include non-repeating patterns including silicone rubber, various elastomers or other high-traction materials. In an embodiment of the present disclosure, the high-traction material may be directly embedded below the top surface 1322 of the compressible regions 1304 of flexible fibers 1306. The height difference between the top surfaces 1320 of the one or more columns 1318 and the compressible regions 1304 of flexible fiber 1306 may be defined based on the traction requirements and the application of external pressure. The embedded non-repeating patterns of high-traction material may ensure better grip during yoga positions and postures.

The traction pattern in the one or more columns 1318 may be generated with the use of one or more continuous threads of a high-traction material. The material used for these threads be a rubber, silicone, or any other elastomer that may offer sufficient traction. In accordance with various embodiments, several other types of traction materials may be utilized to provide stitched patterns. In various embodiments, these threads may be stitched on the top surface 1308 of the absorption layer 1302 to form the one or more columns 1318. There can also be a bottom layer that is waterproof or moisture resistant and/or has traction properties for adhering to a mat or the floor.

Another objective of the present disclosure is to provide a towel that may absorb sweat and prevent slipping once hands and feet are moist, and also protect the mat (such as the mat 100) from absorbing perspiration. In embodiments, the towel 1300 may include a moisture barrier or waterproofing layer or connection grip layer that may be disposed below the absorption layer 1302. This moisture barrier may be formed of a waterproof material. In embodiments, the waterproofing layer may be coated in a material that provides fraction, such as silicone or many other plastic, rubber or other resins. The second layer 304 may be adapted to reduce sweat and moisture of the user from penetrating beneath the towel 1300 when the towel 1300 is disposed above the mat 100. This may facilitate in maintaining the mat 100 in sanitary condition. The silicone or other impermeable coating may provide gripping and sticking capability to the moisture barrier, thereby creating a connection between the mat 100 and the towel 1300. This may provide stability to the towel 1300 during various flow sequences of the user, especially during a gliding motion. In addition, the moisture barrier may connect the towel 1300 and the mat 100 with an additional surface area. Further, the weight of the waterproof material and/or the silicone coating may provide additional traction to avoid bunching and scrunching of the towel 1300. Further, the stiffness of the waterproof material and/or silicone coating may encourage the towel 1300 to lie flat and stable against the mat 100 thereby minimizing the sliding and bunching that plagues the towels on the market today. The two-layer construction of the towel 1300 may increase its weight, thereby stabilizing the towel 1300 on the mat 100 during yoga practice.

In accordance with various embodiments of the present disclosure, the moisture barrier may be formed of rip-stop nylon with bottom high-grip polyurethane coating. However, it must be appreciated by a person ordinarily skilled in the art that various other materials may be utilized in the formation and construction of the moisture barrier. The permeability of the moisture barrier may vary based on the requirements.

FIG. 14 depicts coupling between a towel 1402 and a mat 1404, in accordance with an embodiment of the present disclosure. Referring to FIG. 14, the towel 1402 may have slits 1408 to enable attachment to the mat 1404. In an embodiment, the corners of the mat 1404 may be pulled through some or all the slits 1408 of the towel 1402 to enable securing the towel 1402 to the mat 1404 and forming a mat/towel assembly 1410. In an embodiment, the mat 1404 may alternatively or additionally have slits to enable pulling the corners of the towel 1402 through the mat 1404 slits. In embodiments, the corners of the towel 1402 may additionally be secured to the mat 1404 through any number of attachment or fastener mechanisms, such as a hook and loop fastener, a removable adhesive, a button, a snap, a zipper, and the like.

Similarly, in accordance with various other embodiments of the present disclosure, several other kinds of coupling mechanisms may be utilized without limitations for coupling the towel 1402 and the mat 1404 to form an integrated mat/towel assembly. The mat towel 1402 and the mat 1404 may be any towel and mat, respectively, as described above in various embodiments of the present disclosure. Alternatively, in another embodiment, the towel 1402 may be any ordinary towel, whereas the mat 1404 may be the mat of the present disclosure. Alternatively, in yet another embodiment, the towel 1402 may be the towel of the present disclosure, whereas the mat 1404 may be any ordinary mat.

FIGS. 15A and 15B depict compressed and uncompressed configurations of a towel 1500, in accordance with an embodiment of the present disclosure. FIG. 15A depicts the uncompressed configuration of the towel 1500, whereas the FIG. 15B depicts the compressed configuration. Various elements (in terms of in their functionalities and configurations) disclosed in FIGS. 15A and 15B are the same as that in FIGS. 13B and 13C, respectively, except that the towel 1500 includes one or more columns 1502 disposed in openings 1504 (instead of the one or more columns 1318 disposed on the one or more second portions 1312) formed through the one or more second portions 1312 of the top surface 1308 of the absorption layer 1302. Alternatively, in another embodiment, the one or more columns 1502 may be disposed proximate to the openings 1504 (similar to that done in the mat embodiments described earlier). Further, the towel 1500 includes a bottom layer 1508 formed of a high-traction material. As illustrated in FIGS. 15A and 15B, the bottom layer 1508 is disposed below the absorption layer 1302. In some embodiments, the bottom layer 1508 may have a higher density than that of the absorption layer 1302. In an embodiment, the bottom layer attached to the absorption layer 1302 may facilitate in trapping the one or more columns 1502 into the towel 1500.

As shown in FIG. 15B, a surface 1510 defined by connecting top surfaces 1512 of the one or more columns 1502 is planar. However, a towel that has such a surface as non-planar may be similarly deployed without limiting the scope of the present disclosure. The non-planar surface of the towel in that case will be similar to that described above in various embodiments of the mat (such as the mat 700 or 800).

In accordance with various embodiments of the present disclosure, the towel 1300 or 1402 or 1500 may be customized based on specific requirements. The traction pattern created by a high traction material may be designed accordingly. For example, the high traction material may form a continuous pattern throughout the grip zone in accordance with an embodiment of the present disclosure. In another embodiment, the high traction material may form a discontinuous pattern and may be embedded in discrete units. In yet another embodiment, a high-traction coating may be applied to offer the required traction and grip.

In accordance with various embodiments of the present disclosure, the colors of the towel 1300 or 1402 or 1500 and various layers such as the absorption layer 1302, the moisture barrier 304, and the one or more columns 1318 may vary based on user preferences. The hardness of the one or more columns 1318 may vary in durometer based on requirements. For example, the hardness of the columns may be 20 Shore A, in accordance with an embodiment of the present disclosure.

FIG. 16 depicts the compressed configuration of a grip apparatus 1600 during standing and stationary posture, in accordance with an embodiment of the present disclosure. The grip apparatus 1600 may be a towel, a mat, or the like. As an exemplary scenario, FIG. 16 is described considering the grip apparatus 1600 to be a mat. As shown in FIG. 16, the standing posture is a single-footed standing posture typical of yoga. The grip apparatus 1600 includes a top surface 1602. The grip apparatus 1600 further includes a first layer 1604, which may be made of a material such as compressible foam or any other material that is compressible, durable and light. As shown in FIG. 16, the grip apparatus 1600 only includes a single layer, i.e., the first layer 1604. Therefore, in this case, the top surface 1602 of the grip apparatus 1600 will be the same as the top surface of the first layer 1604.

The top surface 1602 may include one or more traction surface regions defined in the area where user's hands and/or feet come in contact with the grip apparatus 1600. FIG. 16 shows one such case where a user's foot 1608 comes in contact with a traction surface region 1610. The traction surface region 1610 may be designed in such a way that they may provide stability (or support) to the user's foot 1608 during the standing and stationary posture. In accordance with various embodiments, the traction surface region 1610 may be composed of a material or have a surface roughness that may offer frictional resistance to the foot 1608 in a direction perpendicular to the top surface 1602 of the grip apparatus 1600 or the first layer 1604. Additionally, the traction surface region 1610 may be configured to provide traction to the user's foot 1608 during movements and postures, thereby avoiding users from any feeling of unsteadiness, distraction, and frustration.

The top surface 1602 of the first layer 1604 in the traction surface region 1610 may include one or more first portions 1612. The top surface 1602 in the traction surface region 1610 other than the first portions 1612 forms one or more second portions 1614. As shown in FIG. 16, the second portions 1614 are disposed between the first portions 1612.

In various embodiments, openings 1618 may be formed through the one or more first portions 1612. As shown in FIG. 16, one or more columns 1620 formed of a thermoplastic elastomer such as a rubber or any other synthetic material may be disposed in the openings 1618. In various embodiments, top surfaces 1622 of the columns 1620 may be formed of a traction material that may offer traction higher or lower than that offered by the fraction material used to form the second portions 1614 (i.e., the first layer 1604). As described in accordance with various embodiments described earlier (e.g., as shown and described in conjunction with FIGS. 7A and 8A), the top surfaces 1622 of some or all the columns 1620 may be below the top surface 1602 of the first layer 1604 (or the second portions 1614) in the uncompressed configuration. Further, as shown in FIG. 16, the second portions 1614 may compress when the user applies pressure during the standing pose or any other activity that involves contact of the user's foot 1608 with the traction surface region 1610. In the embodiment disclosed in FIG. 16, the second portions 1614 depress substantially more than the top surfaces 1622 of the columns 1620 in the compressed configuration. Therefore, the compression of the second portions 1614 may facilitate the engagement of some or all the columns 1620 with the foot 1608 to offer support to the user. The columns 1620 are able to provide support to the foot 1608 by causing the resistance to movement of the foot 1608 in a direction perpendicular to the top surface 1602 of the first layer 1604. The columns 1620, being more rigid than the first layer 1604, provide more stability/support than the cushioning first layer 1604 when the columns 1620 engage with the foot 1608, thus improving the user's balance.

It must be appreciated by a person ordinarily skilled in the art that though the disclosure has been described in terms of yoga, the present disclosure may be utilized equally for other activities, forms of exercising, sporting and the like without limiting the spirit and scope of the present disclosure. A grip apparatus similar to the mat (such as the mat 100) or the towel (such as the towel 1300) disclosed in the present disclosure may be used in various applications. In an exemplary embodiment, the grip apparatus may be adapted to form an outside surface of at least a portion of a glove, a sock, a bat, a hockey stick, a racquet, or the like. In another exemplary embodiment, the grip apparatus may be a strip or a tape.

The present disclosure described above has several applications and advantages, some of which are stated below without limitations.

An advantage of the present disclosure is that the mat and the towel may increase the performance of a user or a yogi.

Another advantage of the present disclosure is that the mat and the towel may be used in heated and cooled environments without compromising the performance.

Yet another advantage of the present disclosure is that the mat may include different areas with differentiated construction patterns based on varying requirements on different locations of the mat.

Still another advantage of the present disclosure is that the mat may provide the required traction to a user without compromising glide. The required traction may be provided in the prevalent areas of the mat based on requirements. Therefore, a user may get a neutral tactile feel during movements and postures, thereby avoiding any distraction during yoga practice. Further, the mat may provide comfort and stability, especially during standing and stationary postures such as the challenging single-footed standing posture and the like. The traction may be provided to the mat while still achieving lightness and portability. Furthermore, the mat may create an additional traction to the floor surface, and also protect and keep the mat clean.

Still another advantage of the present disclosure is that the mat may provide the desired stiffness and cushioning effect without compromising portability.

Still another advantage of the present disclosure is that the mat may achieve a limited sweat condition to keep the mat clean over time and also offer a waterproofing impact to the mat.

Still another advantage of the present disclosure is that the towel may absorb sweat and prevent slipping once hands and feet are moist, and protect the mat from absorbing perspiration. The towel may also include a moisture barrier that may keep the moisture from penetrating into and onto the mat from the towel. The moisture barrier may further connect the towel and the mat with more surface area, thereby avoiding bunching and scrunching.

Still another advantage of the present disclosure is that the towel may provide sufficient topside traction, especially in the hands and feet area without compromising glide. The traction may be delivered only on application of an external pressure that may further allow the user to glide comfortably. Further, the towel may provide sufficient grip on the bottom side to make it stable on the mat.

Still another advantage of the present disclosure is that the towel may include multiple layers that may increase the towel weight and stiffness and further stabilize it on the mat surface.

Still another advantage of the present disclosure is that the grip apparatus may increase the performance of a user.

Another advantage of the present disclosure is that the grip apparatus may be used in heated and cooled environments without compromising the performance.

Yet another advantage of the present disclosure is that the grip apparatus may include different areas with differentiated construction patterns based on varying requirements on different locations of the grip apparatus.

Still another advantage of the present disclosure is that the grip apparatus may provide traction without compromising glide. The required fraction may be provided in the prevalent areas of the mat based on requirements. Therefore, a user may get a neutral tactile feel during use, thereby avoiding any distraction. Further, the grip apparatus may provide comfort and stability during use.

Still another advantage of the present disclosure is that the grip apparatus may absorb sweat and prevent slipping once hands are moist, and protect the grip from absorbing perspiration. The grip apparatus may also include a moisture barrier that may keep the moisture from penetrating into and onto the object being gripped.

Still another advantage of the present disclosure is that the grip apparatus may provide sufficient traction without compromising smooth, unobstructed movement. The traction may be delivered only on application of an external pressure that may further allow the user to change grip positions comfortably and without distraction.

Figure 17:
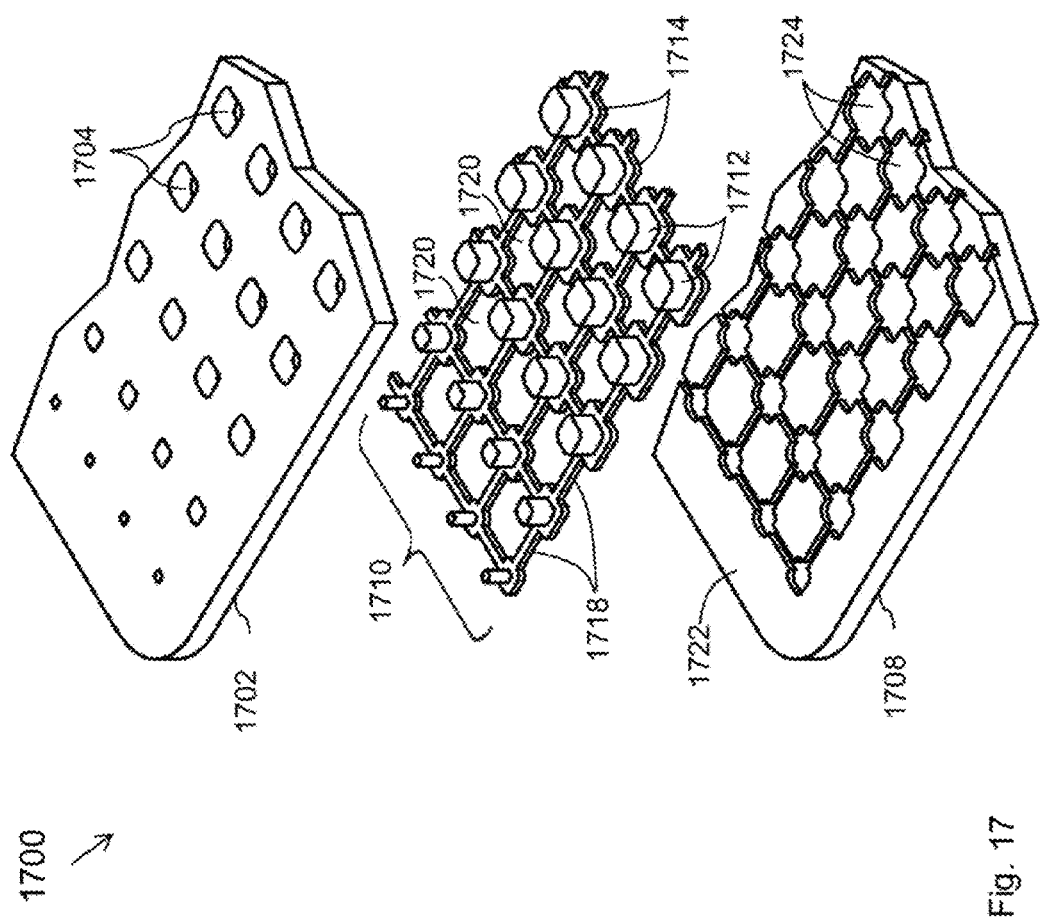
FIG. 17 depicts a perspective view of an alternative layered structure of the grip zone of a mat, in accordance with an embodiment of the present disclosure.

In an embodiment described in conjunction with FIG. 2, the first layer 104's grip zone and the second layer are separated by the elastomeric grip component 204. FIG. 17 depicts a perspective view of an alternative layered structure of the grip zone of a mat 1700 or for use in a reversible grip apparatus, in accordance with an embodiment of the present disclosure. As shown in FIG. 17, the grip zone of the mat 1700 includes a top layer 1702 with an array of openings 1704 (hereinafter referred to as 'openings 1704'), a second layer such as a bottom layer 1708, and a grip component 1710 molded or formed of an elastomer or a flexible polymeric material. The grip component 1710 may include an array of columns 1712 (hereinafter referred to as 'columns 1712'), flanges 1714 that extend horizontally outwards from the bottom ends of each of the columns 1712, and connecting segments 1718 that connect the flanges 1714 of the columns 1712. The undersides (not shown) of the columns 1712 may be hollow to enhance their compressibility. The flanges 1714 may prevent the columns 1712 from being removed from the mat 1700 during use. In the exemplary embodiment, the thickness of the connecting segments 1718 are equal to the thickness of the flanges 1714, although the thickness of the connecting segments 1718 may be different from the thickness of the flanges 1714. Alternatively, the grip component 1710 may not include flanges 1714 and the connecting segments 1718 may directly connect the columns 1712. The connecting segments 1718 may align the columns 1712 in a configuration that facilitates coupling the grip component 1710 through the bottom surface of the grip zone of the top layer 1702 such that the columns 1712 fix into the openings 1704 of the top layer 1702. The flanges 1714 and the connecting segments 1718 may form openings 1720 through the grip component 1710. The top surface 1722 of the bottom layer 1708 and the bottom surface (not shown) of the top layer 1702 may have embossed regions 1724 that correspond to the shape and at least a portion of the thickness of the flanges 1714 and of the connecting segments 1718 such that the top surface 1722 of the bottom layer 1708 and the bottom surface (not shown) of the top layer 1702 directly contact one another when assembled with the grip component 1710. Alternatively, only the top surface 1722 of the bottom layer 1708 or only the bottom surface (not shown) of the top layer 1702 may have the embossed regions 1724. Alternatively, neither the bottom surface (not shown) of the top layer 1702 nor the top surface 1722 of the bottom layer 1708 may have embossed regions, in which case the direct contact between the top layer 1702 and the bottom layer 1708 occurs when the top layer 1702 and the bottom layer 1708 compress in the regions corresponding to the flanges 1714 and the connecting segments 1718 of the grip component 1710. The top layer 1702 and the bottom layer 1708 may be bonded together in the areas where they make direct contact with an adhesive, by a bonding process involving heat or solvents, or with any other feature or by any other process that may securely join the top layer 1702 and the bottom layer 1708. The direct contact between the top layer 1702 and the bottom layer 1708 may enhance the feel and increase the apparent compressibility of the top layer 1702 during use, and may also enhance the adhesion between the top layer 1702 and the bottom layer 1708, thereby improving the overall durability of the mat 1700.

Figure 18:
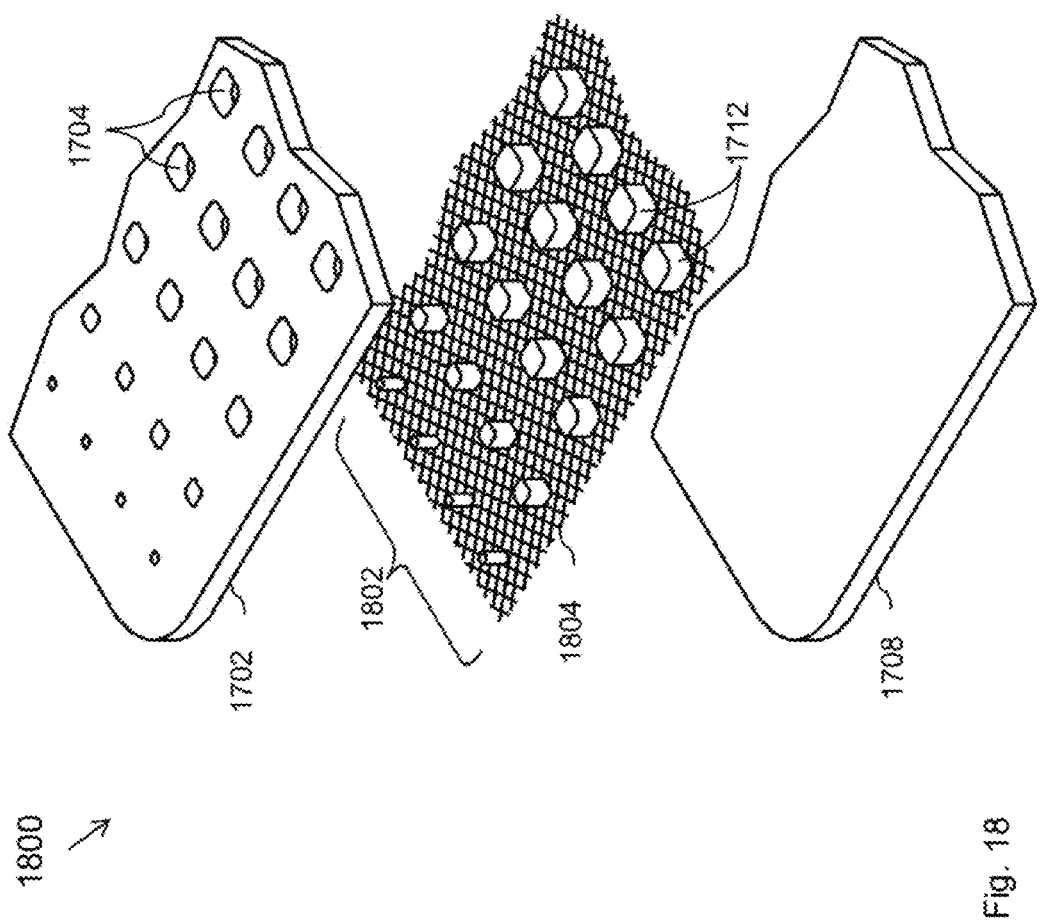
FIG. 18 depicts a perspective view of a layered structure of the grip zone of a mat, in accordance with an embodiment of the present disclosure.

In the embodiment described in conjunction with FIG. 17, the grip component 1710 includes columns 1712, flanges 1714 and connecting segments 1718 that may be molded or formed together of the same material. Alternatively, the connecting segments may be of a different material or materials and may be made by different processes than the columns. FIG. 18 depicts a perspective view of a layered structure of the grip zone of a mat 1800 or for use in a reversible grip apparatus, in accordance with an embodiment of the present disclosure. As shown in FIG. 18, the grip zone of the mat 1800 includes the top layer 1702 with the openings 1704, the bottom layer 1708, and a grip component 1802. The grip component 1802 may include the columns 1712 and a connecting web 1804 that connects all the columns 1712. The connecting web 1804 may consist of loosely-woven fibers such that there are spaces between the fibers, or be made of a woven fabric, a nonwoven fabric, or a thin sheet of material, with an array of openings stamped, cut or burned through. The columns 1712 may be molded or formed directly to the connecting web 1804, or may be bonded to the connecting web 1804 with adhesive or by a bonding process. Alternatively, the columns 1712 may be directly woven into the connecting web 1804 during the weaving process. The spaces between the fibers of the connecting web 1804 may allow the top layer 1702 and the bottom layer 1708 to directly contact one another. The top layer 1702 and the bottom layer 1708 may be bonded together in the areas where they make direct contact, either with an adhesive, by a bonding process involving heat or solvents, or with any other feature or by any other process that may securely join the top layer 1702 and the bottom layer 1708. The direct contact between the top layer 1702 and the bottom layer 1708 in the areas corresponding to the spaces between the fibers of the connecting web 1804 may enhance the feel and increase the apparent compressibility of the top layer 1702 during use, may increase the overall flexibility of the mat 1800, thereby improve its rolling and unrolling characteristics, and may enhance the adhesion between the top layer 1702 and the bottom layer 1708, thereby improving the overall durability of the mat 1800.

In the embodiment described in conjunction with FIG. 1, the mat 100 may be customized based on the user's requirements and preferences. It may be advantageous for the two grip zones proximate to each end of a mat to have characteristics that differ from one another. For example, the hands and feet may have different characteristics, including structure, shape, the ability to apply and tolerate load, pressure and friction, and need for stability. Accordingly, the grip zone characteristics advantageous for supporting, cushioning, stabilizing and providing traction for the hands may differ significantly from the grip zone characteristics advantageous for supporting, cushioning, stabilizing and providing traction for the feet. FIG. 19 depicts a perspective view of a mat 1900, in accordance with various embodiments of the present disclosure. As shown in FIG. 19, the mat 1900 includes two grip zones 1902*a* and 1902*b* on its top surface 1904, each grip zone 1902*a* and 1902*b* having characteristics that differ from one another, in accordance with various embodiments of the present disclosure. Grip zone 1902*a* may be configured to provide enhanced support, cushioning, stabilization or fraction, or any combination thereof, for the user's hands. A grip zone adapted for the hands may have a relatively more compressible top layer or bottom layer or grip columns to provide relatively more cushioning for the hands and fingertips. In an exemplary embodiment, grip zone 1902*a* may have grip columns with a Shore A durometer in the range of 10 to 45. Alternatively, the top surfaces of the grip columns may have larger edge radii for the relatively more sensitive hands and fingertips. In an exemplary embodiment, the top surfaces of the grip columns in grip zone 1902*a* may have edge radii in the range of 0.5 mm to 1.5 mm. Alternatively, a grip zone adapted for the hands may have more grip columns per unit area of grip zone so as to better engage with the user's fingers. In an exemplary embodiment, grip zone 1902*a* may have from 0.1 to 0.5 grip columns per square centimeter. Alternatively, a grip zone adapted for the hands may have grip columns with smaller top surfaces so as to better engage with the user's fingers. In an exemplary embodiment, grip zone 1902*a* may have grip columns with top surfaces from 1 to 400 square millimeters in size. Alternatively, a grip zone adapted for the hands may have any combination of a relatively more compressible top layer or bottom layer or grip columns, or larger edge radii on the top surfaces of the grip columns, or more grip columns per unit area of grip zone, or grip columns with smaller top surfaces, or any combination of features and characteristics, such as grip zone size, shape or location, grip column size or shape, grip column number, grip zone pattern, grip column top surface profile, top layer or bottom layer material or characteristics, or grip column material, construction or compressibility, that enable the grip zone to provide a better combination of traction, cushion, support and stability for the hands. The grip column top surface profile may include ribs, indentations, raised areas, raised letters, indented letters, raised or indented numerals, raised or indented icons, raised or indented shapes, slopes, and the like. Grip zone 1902*b* may be configured to provide enhanced support, cushioning, stabilization or traction, or any combination thereof, for the user's feet. A grip zone adapted for the feet may have a relatively less compressible top layer or bottom layer or grip columns to provide relatively more stability for standing poses. In an exemplary embodiment, grip zone 1902b may have grip columns with a Shore A durometer in the range of 35 to 100. Alternatively, the top surfaces of the grip columns may have smaller edge radii for relatively greater engagement and traction. In an exemplary embodiment, the top surfaces of the grip columns in grip zone 1902b may have top surface edge radii in the range of 0.1 mm to 0.75 mm. Alternatively, a grip zone adapted for the feet may have less grip columns per unit area of grip zone. In an exemplary embodiment, grip zone 1902b may have from 0.04 to 0.2 grip columns per square centimeter. Alternatively, a grip zone adapted for the feet may have grip columns with larger top surfaces. In an exemplary embodiment, grip zone 1902b may have grip columns with top surfaces from 10 to 2500 square millimeters in size. Alternatively, a grip zone adapted for the hands may have any combination of a relatively less compressible top layer or bottom layer or grip columns, or smaller edge radii on the top surfaces of the grip columns, or less grip columns per unit area of grip zone, or grip columns with larger top surfaces, or any combination of features and characteristics, such as grip zone size, shape or location, grip column size or shape, grip column number, grip zone pattern, grip column top surface profile, top layer or bottom layer material or characteristics, or grip column material, construction or compressibility, that enable the grip zone to provide a better combination of traction, cushion, support and stability for the feet. The top surface 1904 of the mat 1900 may include textual cues 1908a and 1908b proximate to the grip zones 1902a and 1902b, respectively, to indicate the proper orientation for using the mat 1900. Users may orient the mat such that the textual cues 1908a and 1908b are in the proper orientation for reading. Alternatively, the top surface 1904 of the mat 1900 may include graphic symbols or diagrams, or may be color coded, or the grip zones 1902a and 1902b may have shapes or patterns, or any combination thereof, to indicate the proper orientation for using the mat 1900. The mat 1900 may provide enhanced overall performance because grip zone 1902a is uniquely configured for the user's hands and grip zone 1902b is uniquely configured for the user's feet.

A yoga mat with two different grip zone configurations may also allow a single mat to address the differing grip needs of advanced users as well as those of basic users. Advanced users may tend to support their upper body weight with particular portions of their hands, such as with their index fingers and thumbs, which may result in relatively higher localized pressures and relatively greater localized deformation of the mat. In contrast, basic users may tend to contact the mat more evenly with the palms and fingers of their hands, which may result in relatively lower localized pressures and relatively lower localized deformation of the mat. Advanced users may also tend to have greater flexibility, so that the soles of their feet may contact the mat when in certain yoga poses such as the one commonly known as the downward facing dog pose. This may result in lower localized pressures and lower localized deformation of the mat. In contrast, basic users may tend to have limited flexibility and therefore may tend to contact the mat with only their toes and the balls of their feet when in certain yoga poses such as the one commonly known as the downward facing dog pose. This may result in higher localized pressures and greater localized deformation of the mat. Because advanced users may tend to support their upper body weight with portions of their hands and basic users may tend to support their lower body weight with portions of their feet, and because both may result in relatively greater localized pressures and relatively greater localized deformation of the mat, a grip zone adapted for the hands of advanced users may also be well adapted for the feet of basic users. A grip zone adapted for the hands of advanced users and for the feet of basic users may have a relatively larger number of grip columns or relatively smaller grip columns to increase the incidence of contact with grip edges, or the grip column surfaces facing the opposite grip zone may be concave to enhance engagement with portions of the hands and feet, or the top layer or the bottom layer or the grip columns may be relatively less compressible to accommodate greater contact pressure, or the top surfaces of the grip columns may be concave to better engage with portions of the hands and feet, or the top surfaces of the grip columns may have larger edge radii to accommodate greater contact pressure, or any combination thereof or any combination of features and characteristics that enable the grip zone to provide a better combination of traction, cushion, support and stability for the hands of advanced users and the feet of basic users. Furthermore, because basic users may tend to support their upper body weight relatively more evenly with the palms and fingers of their hands, and advanced users may tend to support their lower body weight relatively more evenly with their feet, and because both may result in relatively lower localized contact pressures and relatively lower localized deformation of the mat, a grip zone adapted for the hands of basic users may also be well adapted for the feet of advanced users. A grip zone adapted for the hands of basic users and for the feet of advanced users may have a relatively smaller number of grip columns or relatively larger grip columns, or the top layer or the bottom layer or the grip columns may be relatively more compressible, or the grip column surfaces facing the opposite grip zone may be straight and normal to the direction of the opposite grip zone to enhance resistance to forces in the direction away from the opposite grip zone, or the top surfaces of the grip columns may be flat or convex to better engage with the palms and soles, or the top surfaces of the grip columns may have smaller edge radii to better engage with the surfaces of the palms or the soles, or any combination thereof or any combination of features and characteristics that enable the grip zone to provide a better combination of traction, cushion, support and stability for the hands of basic users and the feet of advanced users. Therefore, a mat with two different uniquely configured grip zones may provide benefits for advanced users when they use the mat oriented in one direction, and may also provide benefits for basic users when they use the mat oriented in the opposite direction.

FIG. 20 depicts a perspective view of a mat 2000, and FIGS. 21 and 22 depict perspective views of the mat 2000 being used in the proper orientation for basic users and for advanced users, respectively, in accordance with various embodiments of the present disclosure. As shown in FIG. 20, the mat 2000 includes grip zones 2002a and 2002b on its top surface 2004, each grip zone 2002a and 2002b being configured differently from one another. Grip zone 2002a is configured for the hands of advanced users and for the feet of basic users, and grip zone 2002b is configured for the hands of basic users and for the feet of advanced users. In an exemplary embodiment, grip zone 2002a may have from 0.1 to 0.5 grip columns per square centimeter, or may have grip columns with top surfaces of 1 to 400 square millimeters in size, or may have grip columns with a Shore A durometer in the range of 35 to 100, or any combination thereof, and grip zone 2002b may have from 0.04 to 0.2 grip columns per square centimeter, or may have grip columns with top surfaces of 10 to 2500 square millimeters in size, or may have grip columns with a Shore A durometer in the range of 10 to 45, or any combination thereof. The top surface 2004 of the mat 2000 includes textual cues 2008a and 2008b proximate to the grip zones 2002a and 2002b, respectively, to indicate the proper orientation for use by advanced users and the proper orientation for use by basic users. As shown in FIG. 21, basic users may orient the mat such that they the textual cue for basic users 2008b is in the proper orientation for reading, and as shown in FIG. 22, advanced users may orient the mat such that the textual cue for advanced users 2008a is in the proper orientation for reading. Alternatively, the top surface 2004 of the mat 2000 may include graphical cues, or may be color coded, or the grip zones 2002a and 2002b may have shapes or patterns, or any combination thereof, to indicate the proper orientation for use by advanced users and the proper orientation for use by basic users.

FIGS. 23 and 24 depict top and bottom perspective views, respectively, of an alternative mat 2100 that addresses the particular cushioning, traction and stability needs of two different types of users with a single yoga mat, in accordance with various embodiments of the present disclosure. As shown in FIGS. 23 and 24, the mat 2100 may have grip zones 2102a and 2102b on its top surface 2104 and grip zones 2108a and 2108b on its bottom surface 2110. The grip zones 2102a and 2102b on the top surface 2104 may be configured to provide optimal traction, cushion, support and stability for advanced users, whose hands and feet may experience relatively less discomfort due to extensive practice and who may benefit from greater traction when assuming more challenging yoga poses. Accordingly, grip zones 2102a and 2102 b may have relatively less compressible top layers, bottom layers, or grip columns, or the top surfaces of the grip columns may have smaller edge radii to better engage with the surfaces of the hands and the feet. In an exemplary embodiment, grip zones 2102a and 2102b may have grip columns with a Shore A durometer in the range of 35 to 100, or may have grips with top surface edge radii in the range of 0.1 mm to 0.75 mm, or a combination thereof, or any combination of features and characteristics, such as grip zone size, shape or location, grip column size or shape, grip column number, grip zone pattern, grip column top surface profile, top layer or bottom layer material or characteristics, or grip column material, construction or compressibility, that enable the grip zone to provide a better combination of traction, cushion, support and stability for advanced users. Grip zones 2108a and 2108b on the bottom surface 2110 are configured to provide optimal traction, cushion, support and stability for basic users, who may appreciate a relatively greater amount of comfort and cushioning. Accordingly, grip zones 2102a and 2102b may have relatively more compressible top layers, bottom layers, or grip columns, or the top surfaces of the grip columns may have larger edge radii to provide greater comfort. In an exemplary embodiment, grip zones 2108a and 2108b may have grip columns with a Shore A durometer in the range of 10 to 45, or may have grips with edge radii in the range of 0.5 mm to 1.5 mm, or a combination thereof, or any combination of features and characteristics, such as grip zone size, shape or location, grip column size or shape, grip column number, grip zone pattern, grip column top surface profile, top layer or bottom layer material or characteristics, or grip column material, construction or compressibility, that enable the grip zone to provide a better combination of traction, cushion, support and stability for basic users.

The top surface 2104 and the bottom surface 2110 may each have one or more textual cues 2112 and 2114, respectively, to indicate the proper surface of the mat 2100 for use by advanced users and basic users, respectively.

In use, the advanced user would orient the mat 2100 such that the top surface 2104, with the one or more textual cues 2112 indicating the proper surface for use by advanced users, is facing upward, and the basic user would orient the mat 2100 such that its bottom surface 2110, with the one or more textual cues 2114, indicating the proper surface for use by basic users, is facing upward. Accordingly, the mat 2100 may provide optimal traction, cushion and stability for advanced users and for basic users. As shown in FIGS. 23 and 24, the grip zones 2102a and 2102b may be identical to one another and the grip zones 2108a and 2108b may be identical to one another. Alternatively, the grip zones 2102a and 2102b may each have different characteristics from one another, and the grip zones 2108a and 2108b may each have different characteristics from one another, for example to provide an optimal grip zone for the hands of advanced users, for the feet of advanced users, for the hands of basic users and for the feet of basic users, respectively. Alternatively, the mat 2100 could be configured to provide optimal traction, cushion and stability for two other types of users, such as smaller and larger users or lighter and heavier users, for example. It may also be readily understood that a mat with grip zones on both the top and bottom surfaces will have the added benefit of being less prone to slipping on the floor during use, as the grip zones on the side of the mat that is facing downwards may provide improved traction with the floor.

Figure 25:
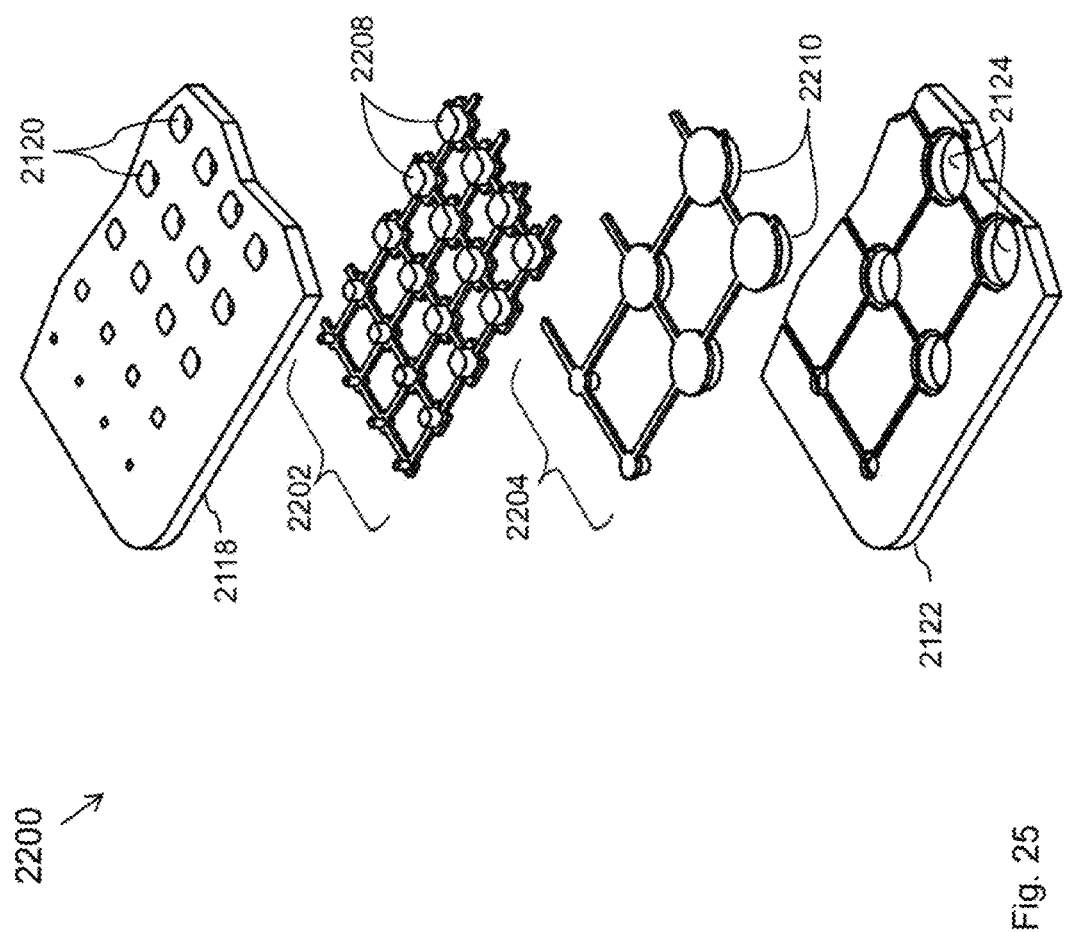
FIG. 25 depicts a perspective view of a layered structure of the grip zones of a mat, in accordance with an embodiment of the present disclosure.

FIG. 25 depicts a perspective view of a layered structure 2200 of a grip zone of a mat 2100, which can also be used in a reversible grip apparatus, in accordance with an embodiment of the present disclosure. As shown in FIG. 25, the structure includes a top layer 2118 with an array of openings 2120 (hereinafter referred to as 'openings 2120'), a second layer such as a bottom layer 2122 with an array of openings 2124 (hereinafter referred to as 'openings 2124'), a top grip component 2202 and a bottom grip component 2204, both molded or formed of an elastomer or a flexible polymeric material. The top grip component 2202 may include an array of columns 2208 (hereinafter referred to as 'columns 2208'), and the bottom grip component 2204 may include an array of columns 2210 (hereinafter referred to as 'columns 2210'). The columns 2208 of the top grip component 2202 and the columns 2210 of the bottom grip component 2204 may have different characteristics, including column size or shape, top surface profile, material, construction or compressibility, or any combination thereof, that may enable the respective grip zones to provide better combinations of traction, cushion, support and stability for advanced users and basic users, respectively. In an exemplary embodiment, grip columns 2208 of the top grip component 2202 may have a Shore A durometer in the range of 35 to 100, or may have top surface edge radii in the range of 0.1 mm to 0.75 mm, or a combination thereof, and grip columns 2210 of the bottom grip component 2204 may have a Shore A durometer in the range of 10 to 45, or may have top surface edge radii in the range of 0.5 mm to 1.5 mm, or a combination thereof. The columns 2208 of the top grip component 2202 and the columns 2210 of the bottom grip element 2204 are in configurations that facilitate in coupling the top grip component 2202 through the openings 2120 of the top layer 2118 and in coupling the bottom grip component 2204 through the openings 2124 of the bottom layer 2122, respectively. This layered mat configuration may provide grip zones with different grip characteristics on both the top surface 2104 and the bottom surface (not shown in this view) of the mat 2100.

Figure 26:
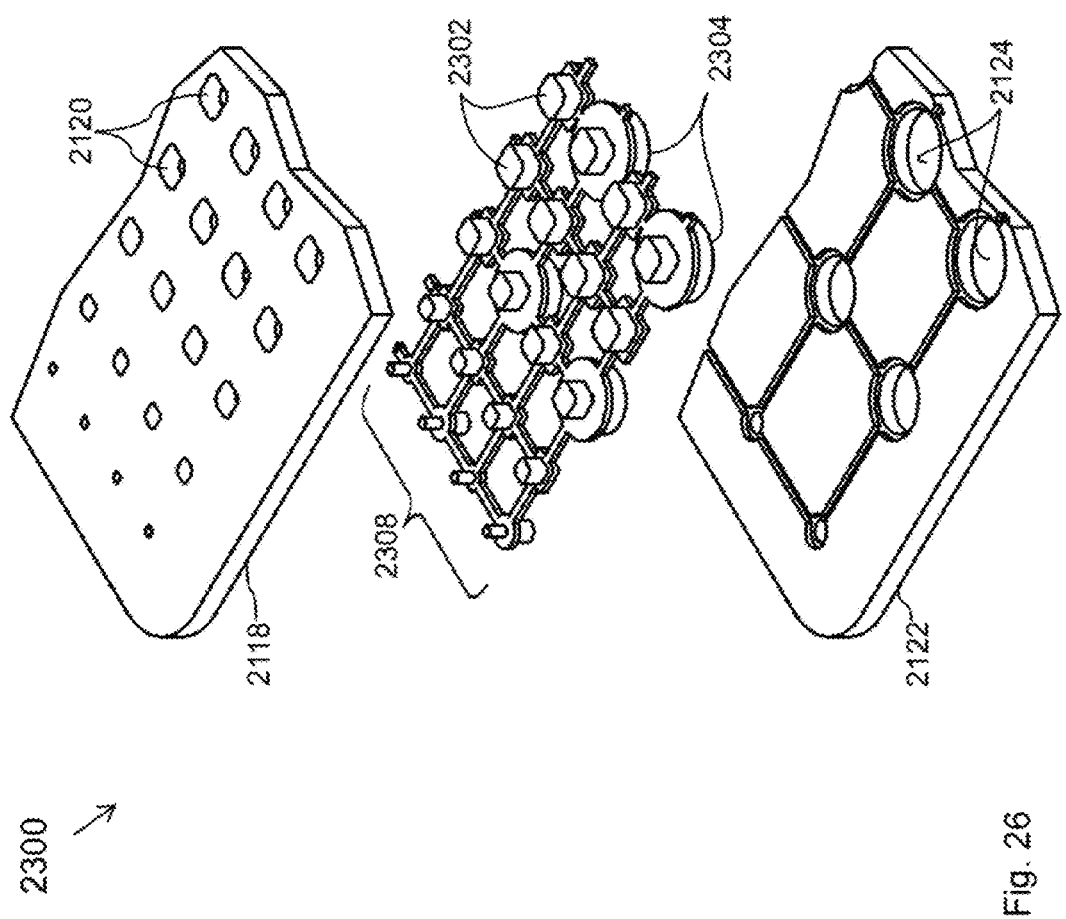
FIG. 26 depicts a perspective view of an alternative layered structure of the grip zones of a mat, in accordance with an embodiment of the present disclosure.

FIG. 26 depicts a perspective view of an alternative layered structure 2300 of a grip zone of a mat 2100, which can also be used in a reversible grip apparatus, in accordance with an embodiment of the present disclosure. As shown in FIG. 26, an array of top columns 2302 that correspond to the openings 2120 in the top layer 2118 and an array of bottom columns 2304 that correspond to the openings 2124 in the bottom layer 2122 are joined together in a combined grip component 2308, thereby reducing the number of components required to assemble the mat 2100 and simplifying its assembly. The top columns 2302 and the bottom columns 2304 of the combined grip component 2308 may have different characteristics, including column size or shape, top surface profile, construction or compressibility, or any combination thereof, that enable the respective grip zones to provide better combinations of traction, cushion, support and stability for advanced users and basic users, respectively. In an exemplary embodiment, top columns 2302 of the combined grip component 2308 may have a Shore A durometer in the range of 35 to 100, or may have top surface edge radii in the range of 0.1 mm to 0.75 mm, or a combination thereof, and bottom columns 2304 of the combined grip component 2308 may have a Shore A durometer in the range of 10 to 45, or may have top surface edge radii in the range of 0.5 mm to 1.5 mm, or a combination thereof.

Figure 27:
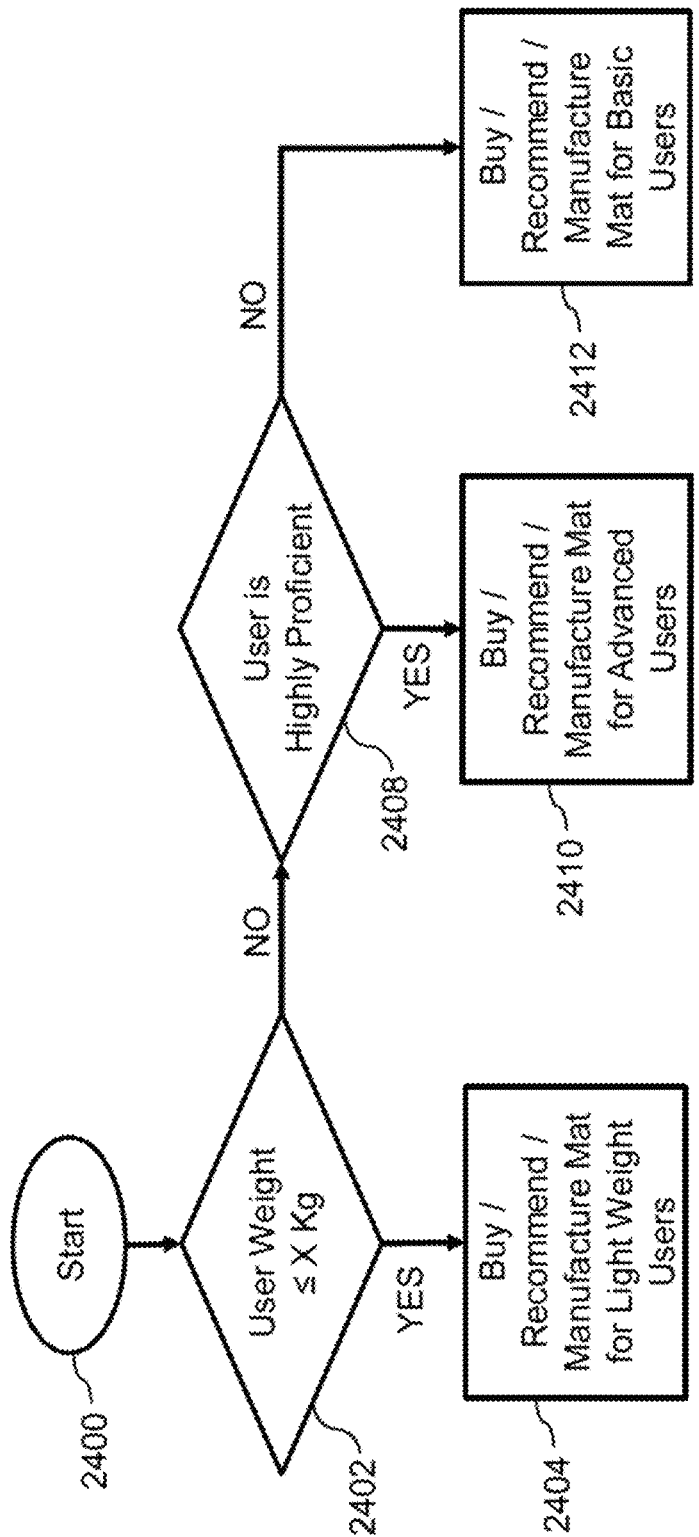
FIG. 27 depicts an exemplary procedure for selecting a yoga mat, in accordance with a seventh embodiment of the present disclosure.

With different yoga mat characteristics to select from, the manufacturer, the retailer and the user may need to identify a mat with the proper characteristics for a particular user. FIG. 27 depicts an exemplary procedure for selecting a yoga mat, in accordance with an embodiment of the present disclosure. As shown in FIG. 27, the outcome of the exemplary procedure is determined based on user weight and either self-reported yoga proficiency or yoga proficiency as determined by assessment, and may be followed by the manufacturer to determine which yoga mat variant to make, by the retailer to recommend to the user which yoga mat variant to buy, or by the user to determine which mat to buy. In 2400, the procedure starts, and in 2402, the users are classified as weighing less than or equal to a threshold weight such as 50 kilograms or weighing greater than a threshold weight such as 50 kilograms. In 2404, users weighing less than a threshold weight such as 50 kilograms are recommended to purchase a mat configured to provide a better combination of traction, cushion, support and stability for lighter-weight users, as lighter-weight users may use less force to support their weight on the mat and they may need a mat with relatively more compressibility. A mat configured for lighter-weight users may have a relatively more compressible top layer or bottom layer or relatively more compressible grip columns or any combination thereof, or any combination of features and characteristics, such as grip zone size, shape or location, grip column size or shape, grip column number, grip zone pattern, grip column top surface profile, top layer or bottom layer material or characteristics, or grip column material, construction or compressibility, that enable the grip zone to provide a better combination of fraction, cushion, support and stability for lighter-weight users. In 2408, users weighing more than a threshold weight such as 50 kilograms are classified as highly proficient or not highly proficient. Self-reported proficiency may be assisted by the use of additional criteria such as the number of years that the user has been practicing yoga, the number of times per week the user practices yoga, and whether the user presses on the mat with the fingertips or with the palms and with only the toes or with the soles of the feet when in certain yoga poses such as the downward facing dog pose. In 2410, highly proficient users are recommended to purchase a mat configured to provide a better combination of traction, cushion, support and stability for advanced users. In 2412, users who are not highly proficient are recommended to purchase a mat configured to provide a better combination of traction, cushion, support and stability for basic users. It should be readily understood that additional criteria, such as additional user weight thresholds, additional levels of proficiency, whether the user practices yoga techniques commonly referred to as hot yoga, may be added to the procedure, and that additional yoga mat variants may also be added to the options that the procedure may recommend.

Figure 28:
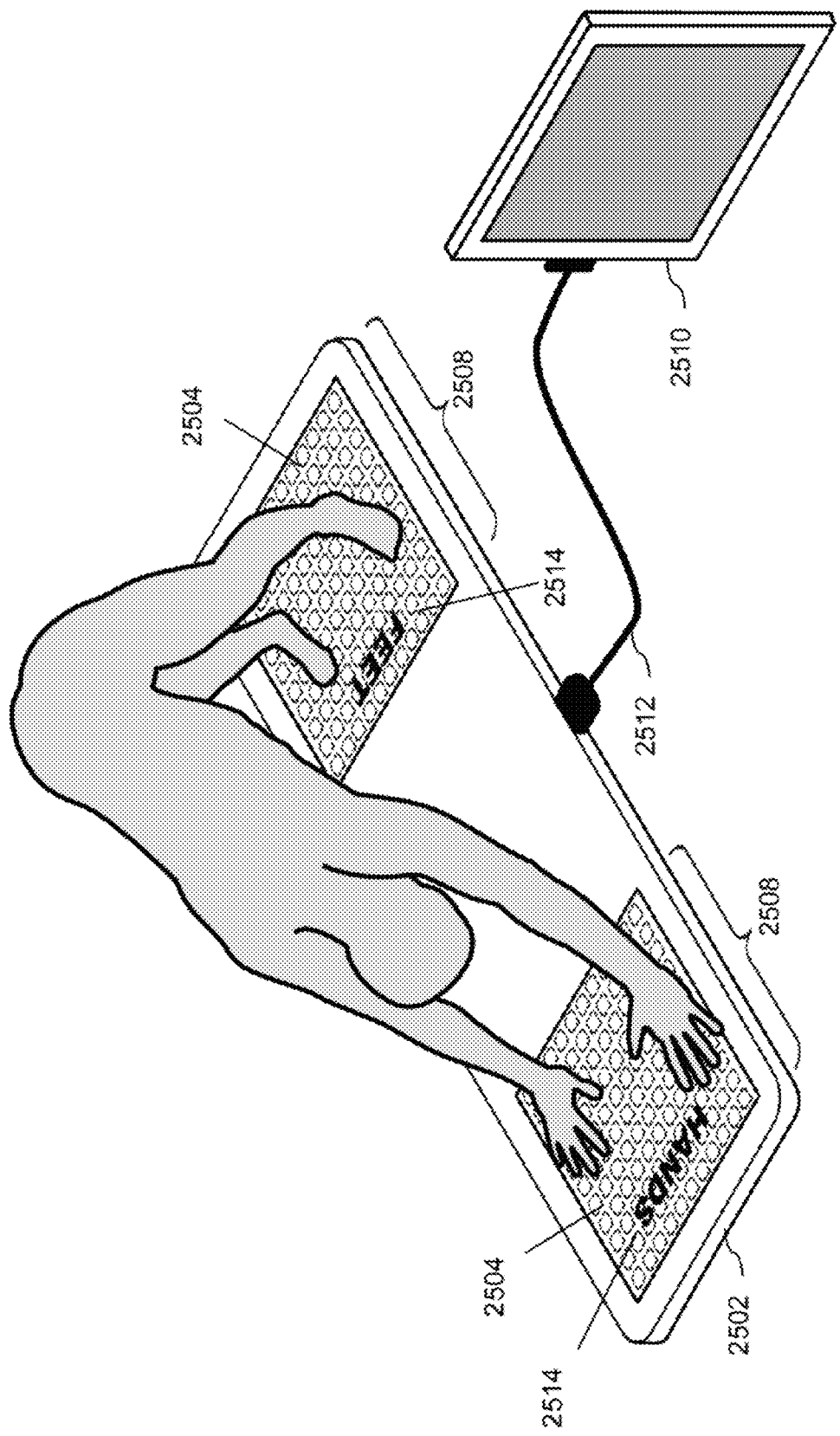
FIG. 28 depicts a perspective view of an apparatus, in accordance with an eighth embodiment of the present disclosure.

User-assessed proficiency may be subjective and may sometimes be inaccurate, and a more objective assessment that does not require the user, the retailer or the manufacturer to have expertise in assessing yoga proficiency may be desired. FIG. 28 depicts a perspective view of an apparatus 2500, in accordance with an embodiment of the present disclosure. As shown in FIG. 28, the apparatus 2500 may include a surface 2502 with at least one array of sensors 2504 within at least one sensor region 2508 with electrical connections (not shown) to an electronic cable connector (not shown), a tablet computer 2510 with specific application software, and an electronic connection such as an electronic cable 2512 or a wireless connection such as a Bluetooth or a WiFi connection, between the at least one array of sensors 2504 and the tablet computer 2510. The surface 2502 may be the top surface of a yoga mat. Alternatively, the surface 2502 may be the top surface of a layer of material that approximates the characteristics of a yoga mat. The sensors may be affixed to the top of the surface 2502, or may be beneath the surface 2502, or may form part of the surface 2502. The sensors in the at least one array of sensors 2504 may detect forces normal to the surface 2502, or they may detect forces in the direction of the length of the surface 2502, or they may detect forces in the direction of the width of the surface 2502, or any combination thereof. Alternatively, the sensors may detect pressure. The at least one sensor region 2508 may have one or more textual or graphical cues 2514 to indicate the appropriate regions for the user's hands and feet. Although the exemplary embodiment as shown in FIG. 28 includes a tablet computer 2510, it may alternatively be substituted with a smartphone, a personal computer, or any device or combination of devices that include at least one input device, at least one output device such as an electronic display device, and at least one electronic computational device with input/output, a processor, and memory or storage. The apparatus 2500 may also include a base (not shown) and one or more housings or enclosures (not shown) to contain, stabilize and secure the apparatus, but this is not required. In the operation of the apparatus, the tablet computer 2510 may prompt the user to input information such as their age, experience, gender, frequency of yoga practice and types of yoga practiced, into the tablet computer 2510, and may then prompt the user to assume one or more yoga poses on the surface 2502. The at least one array of sensors 2504 in the surface 2502 may measure both normal and tangential forces and pressures from the user's hands and feet, and communicates this information through the electronic cable 2512 to the tablet computer 2510, which may analyze the data from the at least one array of sensors 2504 and generate a pressure map of the at least one sensor region 2508, and, optionally, display this pressure map to the user. The tablet computer 2510 may also use the data from the at least one array of sensors 2504 to detect if the user does not have their hands and feet within the at least one sensor region or if the user is wearing shoes, and the tablet computer 2510 may convey a message or messages instructing the user to remove their shoes or move their hands, feet or both hands and feet to within the at least one sensor region 2508. The tablet computer 2510 may then analyze the sensor data to determine the size of the user's palms, the span of the user's hands and feet, the user's overall weight, the relative loads on the user's hands and feet and the relative tangential forces compared to the relative normal forces, to determine if the user presses on the surface 2502 primarily with portions of the hand or with the entire hand when in certain yoga poses, to determine if the user presses on the mat primarily with the toes or with the entire soles of the feet when in certain yoga poses, to determine if the user has relatively well-developed core muscles, to determine if the user is relatively steady or unsteady when assuming the one or more yoga poses on the surface 2502, or to calculate any other measure or measures relevant to identifying the proper mat characteristics for the user. The tablet computer 2510 may then use the analyzed data from the at least one array of sensors 2504, as well as the user-prompted information, in a decision-making process, such as the exemplary process shown in FIG. 28, to identify the yoga mat with the proper characteristics for the user, and may display this information to inform the user of the results. The apparatus 2500 may provide an objective method for identifying the yoga mat with the proper characteristics for the user, and may allow the user to purchase the proper yoga mat with confidence.

While the disclosure has been made in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

All documents referenced herein are hereby incorporated by reference.

What is claimed is:

1. A mat, comprising:
a first layered structure including a first characteristic, said first layered structure located at least partially within a first end section of the mat, the first layered structure including a plurality of first columns, and a plurality of second columns; and
a second layered structure including a second characteristic different than said first characteristic, said second layered structure located at least partially within a second end section of the mat, the second layered structure including a plurality of first columns, and a plurality of second columns
wherein each of the first layered structure and the second layered structure comprise a top layer with a plurality of first openings, and a bottom layer with a plurality of second openings,
wherein the plurality of first columns are configured to translate into the plurality of first openings and the plurality of second columns are configured to translate into the plurality of second openings.

2. The mat of claim 1, further comprising, a top grip component including the plurality of first columns, and a bottom grip component including the plurality of second columns.

3. The mat of claim 2, wherein the first columns and the second columns have different characteristics.

4. The mat of claim 2, wherein the first columns extend at least partially through at least one of the plurality of first openings and the second columns extend at least partially through at least one of the plurality of second openings.

5. The mat of claim 2, wherein the first and second characteristic is at least one of column size, column shape, top surface profile, material, construction and compressibility.

6. The mat of claim 2, wherein the top grip component and the bottom grip component are molded or formed of an elastomer or a flexible polymeric material.

7. The mat of claim 2, wherein the number of first columns is larger than the number of second columns.

8. The mat of claim 2, wherein the first columns are smaller than the second columns.

9. The mat of claim 2, wherein a surface of one or more of the first columns is concave.

10. The mat of claim 2, wherein at least one of the top layer and the first columns has a lower compressibility than at least one of the bottom layer and the second columns.

11. The mat of claim 2, wherein at least one of the top layer and the bottom layer has a higher compressibility than at least one of the first columns and the second columns.

12. The mat of claim 2, wherein a top surface of one or more of the first columns has a larger edge radius than a top surface of one or more of the second columns.

13. The mat of claim 2, wherein a surface of one or more of the second columns is straight and normal to the direction of the opposite layered structure.

14. The mat of claim 2, wherein a top surface of one or more of the second columns is flat or convex.

15. A mat, comprising:
a first layered structure including a top layer with a plurality of top openings, a bottom layer with a plurality of bottom openings, a top grip component including a plurality of top columns that extend at least partially through at least one of the plurality of top openings, and a bottom grip component including a plurality of bottom columns that extend at least partially through at least one of the plurality of bottom openings, said first layered structure located within a first end section of the mat; and
a second layered structure including a second top layer with a plurality of second top openings, a second bottom layer with a plurality of second bottom openings, a second top grip component including a plurality of second top columns that extend at least partially through at least one of the plurality of second top openings, and a second bottom grip component including a plurality of second bottom columns that extend at least partially through at least one of the plurality of second bottom openings, said second layered structure located within a second end section of the mat,
wherein the plurality of bottom columns are configured to translate within the at least one of the plurality of bottom openings, and
wherein the plurality of second bottom columns are configured to translate within the at least one of the plurality of second bottom openings.

16. The mat of claim 15, wherein at least one of the top columns and second top columns include at least one different characteristic as compared to at least one of the bottom columns and the second bottom columns.

17. The mat of claim 15, wherein at least one of the top layer and the second top layer include at least one different characteristic as compared to at least one of the bottom layer and the second bottom layer.

18. The mat of claim 15, wherein at least one of the top layer, second top layer, bottom layer and the second bottom layer has a higher compressibility than at least one of the top columns, second top columns, bottom columns, and second bottom columns.

19. A mat, comprising:
a first layered structure comprising a top layer with a plurality of top openings, a bottom layer with a plurality of bottom openings, and a grip component including a plurality of top columns that extend at least partially through at least one of the plurality of top openings and a plurality of bottom columns that extend at least partially through at least one of the plurality of bottom openings, said first layered structure located within a first end section of the mat; and
a second layered structure comprising a second top layer with a plurality of second top openings, a second bottom layer with a plurality of second bottom openings, and a second grip component including a plurality of second top columns that extend at least partially through at least one of the plurality of second top openings and a plurality of second bottom columns that extend at least partially through at least one of the plurality of second bottom openings, said second layered structure located within a second end section of the mat,
wherein the plurality of bottom columns are configured to translate within the at least one of the plurality of bottom openings, and
wherein the plurality of second bottom columns are configured to translate within the at least one of the plurality of second bottom openings.

20. The mat of claim 19, wherein at least one of the plurality of top columns or second top columns and at least one of the plurality of second columns or second bottom columns have different characteristics.

21. The mat of claim 20, wherein the different characteristics comprise at least one of column size, column shape, top surface profile, material, construction and compressibility.

22. The mat of claim 19, wherein the number of top columns is larger than the number of bottom columns.

23. The mat of claim 19, wherein at least one of the top columns and second top columns are smaller than at least one of the bottom columns and second bottom columns.

24. The mat of claim 19, wherein a surface of at least one of the top columns, second top columns, bottom columns, and second bottom columns is concave.

25. The mat of claim 19, wherein at least one of the top layer, second top layer, bottom layer, and second bottom layer has a higher compressibility than at least one of the top columns, second top columns, bottom columns, and second bottom columns.

26. The layered structure of claim 1, wherein the plurality of first columns are directed generally opposite the plurality of second columns.

* * * * *

UNITED STATES PATENT AND TRADEMARK OFFICE
CERTIFICATE OF CORRECTION

PATENT NO. : 9,463,348 B2  
APPLICATION NO. : 14/446975  
DATED : October 11, 2016  
INVENTOR(S) : Stephanie F. Connaughton et al.

Page 1 of 1

It is certified that error appears in the above-identified patent and that said Letters Patent is hereby corrected as shown below:

In the Specification

In Column 1, Line 43, delete "Vinayasa yoga," and insert -- Vinyasa yoga, --, therefor.

Signed and Sealed this  
Twenty-fourth Day of January, 2017

Michelle K. Lee  
*Director of the United States Patent and Trademark Office*